US012380899B2

(12) United States Patent
Dick et al.

(10) Patent No.: US 12,380,899 B2
(45) Date of Patent: *Aug. 5, 2025

(54) AUDIO ENCODER, AUDIO DECODER, METHODS AND COMPUTER PROGRAM USING JOINTLY ENCODED RESIDUAL SIGNALS

(71) Applicant: Fraunhofer-Gesellschaft zur Foerderung der angewandten Forschung e.V., Munich (DE)

(72) Inventors: Sascha Dick, Nuremberg (DE); Christian Ertel, Eckental (DE); Christian Helmrich, Erlangen (DE); Johannes Hilpert, Nuremberg (DE); Andreas Hoelzer, Erlangen (DE); Achim Kuntz, Hemhofen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,190

(22) Filed: May 22, 2023

(65) Prior Publication Data

US 2024/0029744 A1 Jan. 25, 2024

Related U.S. Application Data

(63) Continuation of application No. 16/990,566, filed on Aug. 11, 2020, now Pat. No. 11,657,826, which is a (Continued)

(30) Foreign Application Priority Data

Jul. 22, 2013 (EP) .................................... 13177376
Oct. 18, 2013 (EP) .................................... 13189305
Jul. 11, 2014 (WO) ................ PCT/EP2014/064915

(51) Int. Cl.
*G10L 19/008* (2013.01)
*G10L 19/00* (2013.01)
(Continued)

(52) U.S. Cl.
CPC ........ *G10L 19/008* (2013.01); *G10L 19/0017* (2013.01); *G10L 21/038* (2013.01); (Continued)

(58) Field of Classification Search
CPC . G10L 19/008; G10L 19/0017; G10L 21/038; H04S 3/008; H04S 7/30; H04S 2400/01; H04S 2400/03; H04S 2420/03
See application file for complete search history.

(56) References Cited

U.S. PATENT DOCUMENTS 5,717,764 A 2/1998 Johnston et al.
5,970,152 A 10/1999 Klayman
(Continued)

FOREIGN PATENT DOCUMENTS

AU 7745894 5/1995
CA 2820199 2/2010
(Continued)

OTHER PUBLICATIONS

Multichannel Sound Technology in Home and Broadcasting Applications, ITU-R Radiocommunication Sector of ITU, ITU-R BS.2159-4, May 2012, https://www.itu.int/dms_pub/itu-r/opb/rep/R-REP-BS.2159-4-2012-PDF-E.pdf.
(Continued)

*Primary Examiner* — Brian L Albertalli
(74) *Attorney, Agent, or Firm* — Dicke, Billig & Czaja, PLLC

(57) ABSTRACT

An audio decoder for providing at least four audio channel signals on the basis of an encoded representation is configured to provide a first residual signal and a second residual
(Continued)

signal on the basis of a jointly encoded representation of the first residual signal and of the second residual signal using a multi-channel decoding. The audio decoder is configured to provide a first audio channel signal and a second audio channel signal on the basis of a first downmix signal and the first residual signal using a residual-signal-assisted multi-channel decoding. The audio decoder is configured to provide a third audio channel signal and a fourth audio channel signal on the basis of a second downmix signal and the second residual signal using a residual-signal-assisted multi-channel decoding. An audio encoder is based on corresponding considerations.

40 Claims, 21 Drawing Sheets

Related U.S. Application Data continuation of application No. 15/948,342, filed on Apr. 9, 2018, now Pat. No. 10,741,188, which is a continuation of application No. 15/167,072, filed on May 27, 2016, now Pat. No. 9,940,938, which is a continuation of application No. 15/004,661, filed on Jan. 22, 2016, now Pat. No. 9,953,656, which is a continuation of application No. PCT/EP2014/064915, filed on Jul. 11, 2014.

(51) Int. Cl.

| | |
|---|---|
| ***G10L 21/038*** | (2013.01) |
| ***H04S 3/00*** | (2006.01) |
| ***H04S 7/00*** | (2006.01) |

(52) U.S. Cl.

CPC ................ *H04S 3/008* (2013.01); *H04S 7/30* (2013.01); *H04S 2400/01* (2013.01); *H04S 2400/03* (2013.01); *H04S 2420/03* (2013.01)

(56) References Cited

U.S. PATENT DOCUMENTS

| | | | |
|---|---|---|---|
| 7,359,854 | B2 | 4/2008 | Nilsson |
| 7,668,722 | B2 | 2/2010 | Villemoes et al. |
| 8,208,641 | B2 | 6/2012 | Oh |
| 8,218,775 | B2 | 7/2012 | Norvell et al. |
| 8,255,228 | B2 | 8/2012 | Hilpert et al. |
| 8,825,496 | B2 | 9/2014 | Setiawan et al. |
| 8,831,931 | B2 | 9/2014 | Kuntz et al. |
| 8,867,753 | B2 | 10/2014 | Neusinger et al. |
| 8,948,404 | B2 | 2/2015 | Kim et al. |
| 8,958,566 | B2 | 2/2015 | Hellmuth et al. |
| 9,053,700 | B2 | 6/2015 | Neusinger et al. |
| 9,099,078 | B2 | 8/2015 | Neusinger et al. |
| 9,226,089 | B2 | 12/2015 | Mundt et al. |
| 9,398,294 | B2 | 7/2016 | Robillard et al. |
| 9,460,724 | B2 | 10/2016 | Herre et al. |
| 9,502,040 | B2 | 11/2016 | Kuntz et al. |
| 9,743,210 | B2 | 8/2017 | Borss et al. |
| 9,936,327 | B2 | 4/2018 | Herre et al. |
| 9,940,938 | B2 | 4/2018 | Dick et al. |
| 9,947,326 | B2 | 4/2018 | Ghido et al. |
| 10,002,621 | B2 | 6/2018 | Disch et al. |
| 10,109,282 | B2 | 10/2018 | Del Galdo et al. |
| 10,154,362 | B2 | 12/2018 | Herre et al. |
| 10,192,563 | B2 | 1/2019 | Fueg et al. |
| 10,249,311 | B2 | 4/2019 | Adami et al. |
| 10,354,661 | B2 | 7/2019 | Dick et al. |
| 10,360,918 | B2 | 7/2019 | Fueg et al. |
| 10,622,000 | B2 | 4/2020 | Ravelli et al. |
| 10,659,900 | B2 | 5/2020 | Borss et al. |
| 2003/0009327 | A1 | 1/2003 | Nilsson |
| 2005/0074127 | A1 | 4/2005 | Herre et al. |
| 2005/0157883 | A1 | 7/2005 | Herre et al. |
| 2006/0190247 | A1 | 8/2006 | Lindblom |
| 2006/0233379 | A1 | 10/2006 | Villemoes et al. |
| 2006/0235678 | A1 | 10/2006 | Kim et al. |
| 2007/0067162 | A1 | 3/2007 | Villemoes |
| 2007/0127733 | A1 | 6/2007 | Henn et al. |
| 2007/0174063 | A1 | 7/2007 | Mehrotra |
| 2007/0233470 | A1 | 10/2007 | Goto et al. |
| 2007/0291951 | A1 | 12/2007 | Faller |
| 2008/0004883 | A1 | 1/2008 | Vilermo et al. |
| 2009/0164223 | A1 | 6/2009 | Fejzo |
| 2009/0274308 | A1 | 11/2009 | Oh |
| 2010/0027819 | A1 | 2/2010 | Van Den Berghe et al. |
| 2010/0121647 | A1 | 5/2010 | Beack et al. |
| 2010/0169102 | A1 | 7/2010 | Samsudin |
| 2010/0211400 | A1 | 8/2010 | Oh et al. |
| 2010/0228554 | A1 | 9/2010 | Beack et al. |
| 2010/0284550 | A1 | 11/2010 | Oh et al. |
| 2010/0322429 | A1 | 12/2010 | Norvell et al. |
| 2010/0332239 | A1 | 12/2010 | Kim et al. |
| 2011/0046964 | A1 | 2/2011 | Moon |
| 2011/0178810 | A1 | 7/2011 | Villemoes et al. |
| 2011/0200198 | A1 | 8/2011 | Grill |
| 2011/0224994 | A1 | 9/2011 | Norvell |
| 2012/0002818 | A1 | 1/2012 | Heiko et al. |
| 2012/0070007 | A1 | 3/2012 | Kim et al. |
| 2012/0130722 | A1 | 5/2012 | Zhan |
| 2012/0213376 | A1 | 8/2012 | Hellmuth et al. |
| 2012/0275607 | A1 | 11/2012 | Kjoerling et al. |
| 2012/0275609 | A1 | 11/2012 | Beack et al. |
| 2013/0028426 | A1 | 1/2013 | Purnhagen et al. |
| 2013/0030819 | A1 | 1/2013 | Purnhagen et al. |
| 2013/0108077 | A1 | 5/2013 | Edler |
| 2013/0124751 | A1 | 5/2013 | Ando et al. |
| 2013/0138446 | A1 | 5/2013 | Hellmuth et al. |
| 2015/0162012 | A1 | 6/2015 | Kastner |
| 2016/0071522 | A1 | 3/2016 | Beack |
| 2016/0247509 | A1 | 8/2016 | Dick et al. |
| 2019/0108842 | A1 | 4/2019 | Dick et al. |
| 2021/0056979 | A1 | 2/2021 | Dick et al. |
| 2021/0233543 | A1 | 7/2021 | Dick et al. |

FOREIGN PATENT DOCUMENTS

| | | |
|---|---|---|
| CA | 2750272 | 8/2010 |
| CA | 2750451 | 8/2010 |
| CA | 2746524 | 10/2010 |
| CA | 2766727 | 12/2010 |
| CA | 2855479 | 12/2010 |
| CA | 2775828 | 4/2011 |
| CA | 2796292 | 10/2011 |
| CA | 2887939 | 3/2012 |
| CA | 2819502 | 6/2012 |
| CA | 2824935 | 7/2012 |
| CA | 2827296 | 8/2012 |
| CA | 2899013 | 8/2014 |
| CA | 2917770 | 1/2015 |
| CA | 2918148 | 1/2015 |
| CA | 2918166 | 1/2015 |
| CA | 2918237 | 1/2015 |
| CA | 2918701 | 1/2015 |
| CA | 2918811 | 1/2015 |
| CA | 2918843 | 1/2015 |
| CA | 2918860 | 1/2015 |
| CA | 2918864 | 1/2015 |
| CA | 2918874 | 1/2015 |
| CA | 2968646 | 1/2015 |
| CA | 2926986 | 4/2015 |
| CA | 2943570 | 10/2015 |
| CN | 1878001 | 12/2006 |
| CN | 1957640 | 5/2007 |
| CN | 10 1010725 | 8/2007 |
| CN | 10 1133441 | 2/2008 |
| CN | 10 1582262 | 11/2009 |
| CN | 101689368 | 3/2010 |
| CN | 10 1695150 | 4/2010 |
| CN | 101802907 | 8/2010 |
| CN | 101849257 | 9/2010 |
| CN | 102388417 | 3/2012 |

(56) References Cited

FOREIGN PATENT DOCUMENTS

| | | | |
|---|---|---|---|
| CN | 102884570 | | 1/2013 |
| CN | 105593931 | | 5/2016 |
| CN | 111105805 | | 5/2020 |
| EP | 1 527 655 | | 4/2006 |
| EP | 2194526 | A1 | 6/2010 |
| GB | 2485979 | A | 6/2012 |
| JP | H07-175499 | | 7/1995 |
| JP | 2009/508433 | | 2/2009 |
| JP | 2010-540985 | | 12/2010 |
| JP | 2011-501230 | | 1/2011 |
| JP | 2011/066868 | | 3/2011 |
| JP | 2013-508770 | | 3/2013 |
| RU | 2 449 387 | | 12/2011 |
| TW | 200627380 | A | 10/1994 |
| TW | 309691 | | 2/1997 |
| TW | 303411 | | 12/2006 |
| TW | 201007695 | A | 2/2010 |
| WO | 2007/111568 | | 10/2007 |
| WO | 2009/049895 | | 4/2009 |
| WO | 2009/078681 | | 6/2009 |
| WO | 2009141775 | A1 | 11/2009 |
| WO | 2012/158333 | | 11/2012 |
| WO | 2012/170385 | | 12/2012 |
| WO | 2014168439 | | 10/2014 |

OTHER PUBLICATIONS

Non-Final Office Action dated Oct. 28, 2021 in U.S. Appl. No. 17/011,584.
Notice of Allowance dated Jun. 27, 2022 in U.S. Appl. No. 17/011,584.
Notice of Allowance dated Jan. 13, 2023 in U.S. Appl. No. 16/990,566.
Non-Final Office Action dated Apr. 26, 2022 in U.S. Appl. No. 16/990,566.
International Search Report and Written Opinion dated Oct. 20, 2014, PCT/EP2014/065416, 10 pages.
Breebaart J. et al., MPEG Spatial Audio Coding / MPEG Surround: Overview and Current Status, Audio Engineering Society Convention Paper, New York, NY, US, Oct. 7, 2015, pp. 1-17 (18 pages).
International Search Report and Written Opinion dated Dec. 10, 2014, PCT/EP2014/064915, 22 pages.
ISO/IEC 23003-3: 2012—Information Technology—MPEG Audio Technologies, Part 3: Unified Speech and Audio Coding (286 pages).
ISO/IEC 13818-7: 2003—Information Technology—Generic coding of moving pictures and associated audio information, Part 7: Advanced audio coding (AAC), (198 pages).
ISO/IEC 23003-2: 2010—Information Technology—MPEG Audio Technologies, Part 2: Spatial Audio Object Coding (SAOC), (134 pages).
ISO/IEC 23003-1: 2007—Information Technology—MPEG Audio Technologies, Part 1: MPEG Surround (288 pages).
Neuendorf Max et al: "MPEG Unified Speech and Audio Coding—The ISO/MPEG Standard for High-Efficiency Audio Coding of All Content Types", AES Convention 132; Apr. 26, 2012, 22 pages.
International Search Report, dated Oct. 6, 2014, PCT/EP2014/065021, 5 pages.
Pontus Carlsson et al., Technical description of CE on Improved Stereo Coding in USAC, 93. MPEG Meeting; Jul. 26, 2010-Jul. 30, 2010; Geneva; (Motion Picture Expert Group or ISO/IEC JTC1/SC29/WG11), No. M17825, Jul. 22, 2010, XP030046415 (22 pages).
Tsingos Nicolas et al.; Surround Sound with Height in Games Using Dolby Pro Logic IIz, Conference: 41st International Conference: Audio for Games; Feb. 2011, AES, 60 East 42nd Street, Room 2520, New York, NY 10165-2520, USA, Feb. 2, 2011 (10 pages).
Tzagkarakis C. et al., A Multichannel Sinusoidal Model Applied to Spot Microphone Signals for Immersive Audio, IEEE Transactions on Audio, Speech and Language Processing, IEEE Service Center, New York, NY, USA, vol. 17, No. 8, Nov. 1, 2009, pp. 1483-1497, XP011329097, ISSN: 1558-7916, DOI: 10.1109/TASL.2009.2021716, http://dx.doi.org/10.1109/TASL.2009.2021716 (16 pages).
ISO/IEC FDIS 23003-3:2011(E), Information Technology—MPEG Audio Technologies 0 Part 3: Unified Speech and Audio Coding. ISO/IEC JTC 1/SC 29.WG 11. Sep. 20, 2011.
Marina Bosi, et al. ISO/IEC MPEG-2 Advanced Audio Coding. Journal of the Audio Engineering Society, 1997, vol. 45, No. 10, pp. 789-814.
ISO/IEC FDIS 23003-1:2006(E). Information Technology—MPEG Audio Technologies Part 1: MPEG Surround. ISO/IEC JTC 1/SC 29/WG 11. Jul. 21, 2006.
Zhang, et al., "A Blind Bandwidth Extension Method of Audio Signals based on Volterra Series", Speech and Audio Signal Processing Laboratory, School of Electronic Information and Control Engineering, Beijing University of Technology, Beijing, China 2012, p. 1-4.
Sinha, et al, "A Novel Integrated Audio Bandwidth Extension Tookkit (ABET)", presented at the 120th Convention, May 20-23, 2006, p. 1-12.
Lyubimov, et al. "Audio Bandwidth Extension using Cluster Weighted Modeling of Spectral Envelopes", presented at the 127th Convention, New York, NY, USA, Oct. 9-12, 2009, p. 1-7.
Parallel Russian Office Action dated Apr. 19, 2017 for Application No. 2016105703/08.
Parallel Japanese Office Action dated May 30, 2017 in Patent Application No. JP2016-528404.
Parallel Russian Office Action dated Aug. 11, 2017 in Patent Application No. 2016105702/08.
Notice of Acceptance dated Oct. 12, 2017 for Patent Application in corresponding Australian patent application No. 2014295360.
Decision to Grant dated Oct. 31, 2017 in parallel Korean Patent Application No. 10-2016-7004626.
ATSC Standard: Digital Audio Compression (AC-3). Advanced Television Systems Committee. Doc.A/52:2012. Dec. 17, 2012.
Chinese Office Action issued Jan. 25, 2019 in parallel CN Application 201480041694.1.

```
UsacChannelPairElementConfig (sbrRatioIndex)
{
        UsacCoreConfig () ;
        if  (sbrRatioIndex > 0)  {
                SbrConfig () ;
                stereoConfigIndex;                          2          uimsbf
        } else {
                stereoConfigIndex = 0;
        }
        if  (stereoConfigIndex > 0)  {
                Mps212Config(stereoConfigIndex) ;
        }
+        qceIndex                                           2          uimsbf
}
```

FIG 14A

| qceIndex | meaning |
|---|---|
| 0 | Stereo CPE |
| 1 | QCE without residual |
| 2 | QCE with residual |
| 3 | -reserved- |

FIG 14B

OVERVIEW 3D-AUDIO ENCODER

OVERVIEW 3D-AUDIO DECODER

STRUCTURE OF FORMAT CONVERTER

QCE DECODER SCHEMATICS

QUAD CHANNEL ENCODER SCHEMATICS

AUDIO ENCODER, AUDIO DECODER, METHODS AND COMPUTER PROGRAM USING JOINTLY ENCODED RESIDUAL SIGNALS

CROSS-REFERENCE TO RELATED APPLICATIONS

This application is a continuation of U.S. application Ser. No. 16/990,566, filed Aug. 11, 2020, which is a continuation of U.S. application Ser. No. 15/948,342, filed Apr. 9, 2018, now U.S. Pat. No. 10,741,188, which is a continuation of U.S. application Ser. No. 15/167,072 filed May 27, 2016, now U.S. Pat. No. 9,940,938, which is a continuation of U.S. application Ser. No. 15/004,661, filed Jan. 22, 2016, now U.S. Pat. No. 9,953,656, which is a continuation of International Application No. PCT/EP2014/064915, filed Jul. 11, 2014, which are incorporated herein by reference in their entirety, and additionally claims priority from European Applications Nos. EP 13177376.4, filed Jul. 22, 2013, and EP 13189305.9, filed Oct. 18, 2013, both of which are incorporated herein by reference in their entirety.

Embodiments according to the invention are related to an audio decoder for providing at least four audio channel signals on the basis of an encoded representation.

Further embodiments according to the invention are related to an audio encoder for providing an encoded representation on the basis of at least four audio channel signals.

Further embodiments according to the invention are related to a method for providing at least four audio channel signals on the basis of an encoded representation and to a method for providing an encoded representation on the basis of at least four audio channel signals.

Further embodiments according to the invention are related to a computer program for performing one of said methods.

Generally speaking, embodiments according the invention are related to a joint coding of n channels.

BACKGROUND OF THE INVENTION

In recent years, a demand for storage and transmission of audio contents has been steadily increasing. Moreover, the quality requirements for the storage and transmission of audio contents has also been increasing steadily. Accordingly, the concepts for the encoding and decoding of audio content have been enhanced. For example, the so-called "advanced audio coding"(AAC) has been developed, which is described, for example, in the International Standard ISO/IEC 13818-7:2003. Moreover, some spatial extensions have been created, like, for example, the so-called "MPEG Surround"-concept which is described, for example, in the international standard ISO/IEC 23003-1:2007. Moreover, additional improvements for the encoding and decoding of spatial information of audio signals are described in the international standard ISO/IEC 23003-2:2010, which relates to the so-called spatial audio object coding (SAOC).

Moreover, a flexible audio encoding/decoding concept, which provides the possibility to encode both general audio signals and speech signals with good coding efficiency and to handle multi-channel audio signals, is defined in the international standard ISO/IEC 23003-3:2012, which describes the so-called "unified speech and audio coding" (USAC) concept.

In MPEG USAC [1], joint stereo coding of two channels is performed using complex prediction, MPS 2-1-1 or unified stereo with band-limited or full-band residual signals.

MPEG surround [2] hierarchically combines OTT and TTT boxes for joint coding of multichannel audio with or without transmission of residual signals.

However, there is a desire to provide an even more advanced concept for an efficient encoding and decoding of three-dimensional audio scenes.

SUMMARY

An embodiment may have an audio decoder for providing at least four audio channel signals on the basis of an encoded representation, wherein the audio decoder is configured to provide a first residual signal and a second residual signal on the basis of a jointly encoded representation of the first residual signal and of the second residual signal using a multi-channel decoding; wherein the audio decoder is configured to provide a first audio channel signal and a second audio channel signal on the basis of a first downmix signal and the first residual signal using a residual-signal-assisted multi-channel decoding; and wherein the audio decoder is configured to provide a third audio channel signal and a fourth audio channel signal on the basis of a second downmix signal and the second residual signal using a residual-signal-assisted multi-channel decoding.

Another embodiment may have an audio encoder for providing an encoded representation on the basis of at least four audio channel signals, wherein the audio encoder is configured to jointly encode at least a first audio channel signal and a second audio channel signal using a residual-signal-assisted multi-channel encoding, to obtain a first downmix signal and a first residual signal; and wherein the audio encoder is configured to jointly encode at least a third audio channel signal and a fourth audio channel signal using a residual-signal-assisted multi-channel encoding, to obtain a second downmix signal and a second residual signal; and wherein the audio encoder is configured to jointly encode the first residual signal and the second residual signal using a multi-channel encoding, to obtain a jointly encoded representation of the residual signals.

According to another embodiment, a method for providing at least four audio channel signals on the basis of an encoded representation may have the steps of: providing a first residual signal and a second residual signal on the basis of a jointly encoded representation of the first residual signal and the second residual signal using a multi-channel decoding; providing a first audio channel signal and a second audio channel signal on the basis of a first downmix signal and the first residual signal using a residual-signal-assisted multi-channel decoding; and providing a third audio channel signal and a fourth audio channel signal on the basis of a second downmix signal and the second residual signal using a residual-signal-assisted multi-channel decoding.

According to another embodiment, a method for providing an encoded representation on the basis of at least four audio channel signals may have the steps of: jointly encoding at least a first audio channel signal and a second audio channel signal using a residual-signal assisted multi-channel encoding, to obtain a first downmix signal and a first residual signal; jointly encoding at least a third audio channel signal and a fourth audio channel signal using a residual-signal-assisted multi-channel encoding, to obtain a second downmix signal and a second residual signal; and jointly encoding the first residual signal and the second residual signal using a multi-channel encoding, to obtain an encoded representation of the residual signals.

Another embodiment may have a non-transitory digital storage medium having stored thereon computer program for performing the above inventive method for providing at least four audio channel signals on the basis of an encoded representation or the above inventive method for providing an encoded representation on the basis of at least four audio channel signals, when said computer program is run by a computer.

An embodiment according to the invention creates an audio decoder for providing at least four audio channel signals on the basis of an encoded representation. The audio decoder is configured to provide a first residual signal and a second residual signal on the basis of a jointly encoded representation of the first residual signal and of the second residual signal using a multi-channel decoding. The audio decoder is also configured to provide a first audio channel signal and a second audio channel signal on the basis of a first downmix signal and the first residual signal using a residual-signal-assisted multi-channel decoding. The audio decoder is also configured to provide a third audio channel signal and a fourth audio channel signal on the basis of a second downmix signal and the second residual signal using a residual-signal-assisted multi-channel decoding.

This embodiment according to the invention is based on the finding that dependencies between four or even more audio channel signals can be exploited by deriving two residual signals, each of which is used to provide two or more audio channel signals using a residual-signal-assisted multi-channel decoding, from a jointly-encoded representation of the residual signals. In other words, it has been found there are typically some similarities of said residual signals, such that a bit rate for encoding said residual signals, which help to improve an audio quality when decoding the at least four audio channel signals, can be reduced by deriving the two residual signals from a jointly-encoded representation using a multi-channel decoding, which exploits similarities and/or dependencies between the residual signals.

In an advantageous embodiment, the audio decoder is configured to provide the first downmix signal and the second downmix signal on the basis of a jointly-encoded representation of the first downmix signal and the second downmix signal using a multi-channel decoding. Accordingly, a hierarchical structure of an audio decoder is created, wherein both the downmix signals and the residual signals, which are used in the residual-signal-assisted multi-channel decoding for providing the at least four audio channel signals, are derived using separate multi-channel decoding. Such a concept is particularly efficient, since the two downmix signals typically comprise similarities, which can be exploited in a multi-channel encoding/decoding, and since the two residual signals typically also comprise similarities, which can be exploited in a multi-channel encoding/decoding. Thus, a good coding efficiency can typically be obtained using this concept.

In an advantageous embodiment, the audio decoder is configured to provide the first residual signal and the second residual signal on the basis of the jointly-encoded representation of the first residual signal and of the second residual signal using a prediction-based multi-channel decoding. The usage of a prediction-based multi-channel decoding typically brings along a comparatively good reconstruction quality for the residual signals. This is, for example, advantageous if the first residual signal represents a left side of an audio scene and the second residual signal represents a right side of the audio scene, because the human hearing is typically comparatively sensitive for differences between the left and right sides of the audio scene.

In an advantageous embodiment, the audio decoder is configured to provide the first residual signal and the second residual signal on the basis of the jointly-encoded representation of the first residual signal and of the second residual signal using a residual-signal-assisted multi-channel decoding. It has been found that a particularly good quality of the first and second residual signal can be achieved if the first residual signal and the second residual signal are provided using a multi-channel decoding, which in turn receives a residual signal (and typically also a downmix signal, which combines the first residual signal and the second residual signal). Thus, there is a cascading of decoding stages, wherein two residual signals (the first residual signal, which is used for providing the first audio channel signal and the second audio channel signal, and the second residual signal, which is used for providing the third audio channel signal and the fourth audio channel signal), are provided on the basis of an input downmix signal and an input residual signal, wherein the latter may also be designated as a common residual signal) of the first residual signal and the second residual signal). Thus, the first residual signal and the second residual signal are actually "intermediate" residual signals, which are derived using a multi-channel decoding from a corresponding downmix signal and a corresponding "common" residual signal.

In an advantageous embodiment, the prediction-based multi-channel decoding is configured to evaluate a prediction parameter describing a contribution of a signal component, which is derived using a signal component of a previous frame, to the provision of the residual signals (i.e., the first residual signal and the second residual signal) of a current frame. Usage of such a prediction-based multi-channel decoding brings along a particularly good quality of the residual signals (first residual signal and second residual signal).

In an advantageous embodiment, the prediction-based multi-channel decoding is configured to obtain the first residual signal and the second residual signal on the basis of a (corresponding) downmix signal and a (corresponding) "common" residual signal, wherein the prediction-based multi-channel decoding is configured to apply the common residual signal with a first sign, to obtain the first residual signal, and to apply the common residual signal with a second sign, which is opposite to the first sign, to obtain the second residual signal. It has been found that such a prediction-based multi-channel decoding brings along a good efficiency for reconstructing the first residual signal and the second residual signal.

In an advantageous embodiment, the audio decoder is configured to provide the first residual signal and the second residual signal on the basis of the jointly-encoded representation of the first residual signal and of the second residual signal using a multi-channel decoding which is operative in the modified-discrete-cosine-transform domain (MDCT domain). It has been found that such a concept can be implemented in an efficient manner, since an audio decoding, which may be used to provide the jointly-encoded representation of the first residual signal and of the second residual signal, advantageously operates in the MDCT domain. Accordingly, intermediate transformations can be avoided by applying the multi-channel decoding for providing the first residual signal and the second residual signal in the MDCT domain.

In an advantageous embodiment, the audio decoder is configured to provide the first residual signal and the second residual signal on the basis of the jointly-encoded representation of the first residual signal and of the second residual signal using a USAC complex stereo prediction (for example, as mentioned in the above referenced USAC standard). It has been found that such a USAC complex stereo prediction brings along good results for the decoding of the first residual signal and of the second residual signal. Moreover, usage of the USAC complex stereo prediction for the decoding of the first residual signal and the second residual signal also allows for a simple implementation of the concept using decoding blocks which are already available in the unified-speech-and-audio coding (USAC). Accordingly, a unified-speech-and-audio coding decoder may be easily reconfigured to perform the decoding concept discussed here.

In an advantageous embodiment, the audio decoder is configured to provide the first audio channel signal and the second audio channel signal on the basis of the first downmix signal and the first residual signal using a parameter-based residual-signal-assisted multi-channel decoding. Similarly, the audio decoder is configured to provide the third audio channel signal and the fourth audio channel signal on the basis of the second downmix signal and the second residual signal using a parameter-based residual-signal-assisted multi-channel decoding. It has been found that such a multi-channel decoding is well-suited for the derivation of the audio channel signals on the basis of the first downmix signal, the first residual signal, the second downmix signal and the second residual signal. Moreover, it has been found that such a parameter-based residual-signal-assisted multi-channel decoding can be implemented with small effort using processing blocks which are already present in typical multi-channel audio decoders.

In an advantageous embodiment, the parameter-based residual-signal-assisted multi-channel decoding is configured to evaluate one or more parameters describing a desired correlation between two channels and/or level differences between two channels in order to provide the two or more audio channel signals on the basis of a respective downmix signal and a respective corresponding residual signal. It has been found that such a parameter-based residual-signal-assisted multi-channel decoding is well adapted for the second stage of a cascaded multi-channel decoding (wherein, advantageously, the first and second downmix signals and the first and second residual signals are provided using a prediction-based multi-channel decoding).

In an advantageous embodiment, the audio decoder is configured to provide the first audio channel signal and the second audio channel signal on the basis of the first downmix signal and the first residual signal using a residual-signal-assisted multi-channel decoding which is operative in the QMF domain. Similarly, the audio decoder is advantageously configured to provide the third audio channel signal and the fourth audio channel signal on the basis of the second downmix signal and the second residual signal using a residual-signal-assisted multi-channel decoding which is operative in the QMF domain. Accordingly, the second stage of the hierarchical multi-channel decoding is operative in the QMF domain, which is well adapted to typical post-processing, which is also often performed in the QMF domain, such that intermediate conversions may be avoided.

In an advantageous embodiment, the audio decoder is configured to provide the first audio channel signal and the second audio channel signal on the basis of the first downmix signal and the first residual signal using an MPEG Surround2-1-2 decoding or a unified stereo decoding. Similarly, the audio decoder is advantageously configured to provide the third audio channel signal and the fourth audio channel signal on the basis of the second downmix signal and the second residual signal using a MPEG Surround2-1-2 decoding or a unified stereo decoding. It has been found that such decoding concepts are particularly well-suited for the second stage of a hierarchical decoding.

In an advantageous embodiment, the first residual signal and the second residual signal are associated with different horizontal positions (or, equivalently, azimuth-positions) of an audio scene. It has been found that it is particularly advantageous to separate residual signals, which are associated with different horizontal positions (or azimuth positions), in a first stage of the hierarchical multi-channel processing because a particularly good hearing impression can be obtained if the perceptually important left/right separation is performed in a first stage of the hierarchical multi-channel decoding.

In an advantageous embodiment, the first audio channel signal and the second channel signal are associated with vertically neighboring positions of the audio scene (or, equivalently, with neighboring elevation positions of the audio scene). Also, the third audio channel signal and the fourth audio channel signal are advantageously associated with vertically neighboring positions of the audio scene (or, equivalently, with neighboring elevation positions of the audio scene). It has been found that good decoding results can be achieved if the separation between upper and lower signals is performed in a second stage of the hierarchical audio decoding (which typically comprises a somewhat smaller separation accuracy than the first stage), since the human auditory system is less sensitive with respect to a vertical position of an audio source when compared to a horizontal position of the audio source.

In an advantageous embodiment, the first audio channel signal and the second audio channel signal are associated with a first horizontal position of an audio scene (or, equivalently, azimuth position), and the third audio channel signal and the fourth audio channel signal are associated with a second horizontal position of the audio scene (or, equivalently, azimuth position), which is different from the first horizontal position (or, equivalently, azimuth position).

Advantageously, the first residual signal is associated with a left side of an audio scene, and the second residual signal is associated with a right side of the audio scene. Accordingly, the left-right separation is performed in a first stage of the hierarchical audio decoding.

In an advantageous embodiment, the first audio channel signal and the second audio channel signal are associated with the left side of the audio scene, and the third audio channel signal and the fourth audio channel signal are associated with a right side of the audio scene.

In another advantageous embodiment, the first audio channel signal is associated with a lower left side of the audio scene, the second audio channel signal is associated with an upper left side of the audio scene, the third audio channel signal is associated with a lower right side of the audio scene, and the fourth audio channel signal is associated with an upper right side of the audio scene. Such an association of the audio channel signals brings along particularly good coding results.

In an advantageous embodiment, the audio decoder is configured to provide the first downmix signal and the second downmix signal on the basis of a jointly-encoded representation of the first downmix signal and the second downmix signal using a multi-channel decoding, wherein the first downmix signal is associated with the left side of an audio scene and the second downmix signal is associated with the right side of the audio scene. It has been found that the downmix signals can also be encoded with good coding efficiency using a multi-channel coding, even if the downmix signals are associated with different sides of the audio scene.

In an advantageous embodiment, the audio decoder is configured to provide the first downmix signal and the second downmix signal on the basis of the jointly-encoded representation of the first downmix signal and of the second downmix signal using a prediction-based multi-channel decoding or even using a residual-signal-assisted prediction-based multi-channel decoding. It has been found that the usage of such multi-channel decoding concepts provides for a particularly good decoding result. Also, existing decoding functions can be reused in some audio decoders.

In an advantageous embodiment, the audio decoder is configured to perform a first multi-channel bandwidth extension on the basis of the first audio channel signal and the third audio channel signal. Also, the audio decoder may be configured to perform a second (typically separate) multi-channel bandwidth extension on the basis of the second audio channel signal and the fourth audio channel signal. It has been found that it is advantageous to perform a possible bandwidth extension on the basis of two audio channel signals which are associated with different sides of an audio scene (wherein different residual signals are typically associated with different sides of the audio scene).

In an advantageous embodiment, the audio decoder is configured to perform the first multi-channel bandwidth extension in order to obtain two or more bandwidth-extended audio channel signals associated with a first common horizontal plane (or, equivalently, with a first common elevation) of an audio scene on the basis of the first audio channel signal and the third audio channel signal and one or more bandwidth extension parameters. Moreover, the audio decoder is advantageously configured to perform the second multi-channel bandwidth extension in order to obtain two or more bandwidth-extended audio channel signals associated with a second common horizontal plane (or, equivalently, a second common elevation) of the audio scene on the basis of the second audio channel signal and the fourth audio channel signal and one or more bandwidth extension parameters. It has been found that such a decoding scheme results in good audio quality, since the multi-channel bandwidth extension can consider stereo characteristics, which are important for the hearing impression, in such an arrangement.

In an advantageous embodiment, the jointly-encoded representation of the first residual signal and of the second residual signal comprises a channel pair element comprising a downmix signal of the first and second residual signal and a common residual signal of the first and second residual signal. It has been found that the encoding of the downmix signal of the first and second residual signal and of the common residual signal of the first and second residual signal using a channel pair element is advantageous since the downmix signal of the first and second residual signal and the common residual signal of the first and second residual signal typically share a number of characteristics. Accordingly, the usage of a channel pair element typically reduces a signaling overhead and consequently allows for an efficient encoding.

In another advantageous embodiment, the audio decoder is configured to provide the first downmix signal and the second downmix signal on the basis of a jointly-encoded representation of the first downmix signal and the second downmix signal using a multi-channel decoding, wherein the jointly-encoded representation of the first downmix signal and of the second downmix signal comprises a channel pair element. the channel pair element comprising a downmix signal of the first and second downmix signal and a common residual signal of the first and second downmix signal. This embodiment is based on the same considerations as the embodiment described before.

Another embodiment according to the invention creates an audio encoder for providing an encoded representation on the basis of at least four audio channel signals. The audio encoder is configured to jointly encode at least a first audio channel signal and a second audio channel signal using a residual-signal-assisted multi-channel encoding, to obtain a first downmix signal and a first residual signal. The audio encoder is configured to jointly encode at least a third audio channel signal and a fourth audio channel signal using a residual-signal-assisted multi-channel encoding, to obtain a second downmix signal and a second residual signal. Moreover, the audio encoder is configured to jointly encode the first residual signal and the second residual signal using a multi-channel encoding, to obtain a jointly-encoded representation of the residual signals. This audio encoder is based on the same considerations as the above-described audio decoder.

Moreover, optional improvements of this audio encoder, and advantageous configurations of the audio encoder, are substantially in parallel with improvements and advantageous configurations of the audio decoder discussed above. Accordingly, reference is made to the above discussion.

Another embodiment according to the invention creates a method for providing at least four audio channel signals on the basis of an encoded representation, which substantially performs the functionality of the audio encoder described above, and which can be supplemented by any of the features and functionalities discussed above.

Another embodiment according to the invention creates a method for providing an encoded representation on the basis of at least four audio channel signals, which substantially fulfills the functionality of the audio decoder described above.

Another embodiment according to the invention creates a computer program for performing the methods mentioned above.

BRIEF DESCRIPTION OF THE DRAWINGS

Embodiments of the present invention will be detailed subsequently referring to the appended drawings, in which:

FIG. 14*a* shows a syntax representation of a bitstream, which can be used with the audio encoder according to FIG. 13;

FIG. 14*b* shows a table representation of different values of the parameter qceIndex;

DETAILED DESCRIPTION OF THE INVENTION

1. Audio Encoder According to FIG. 1

Figure 1:
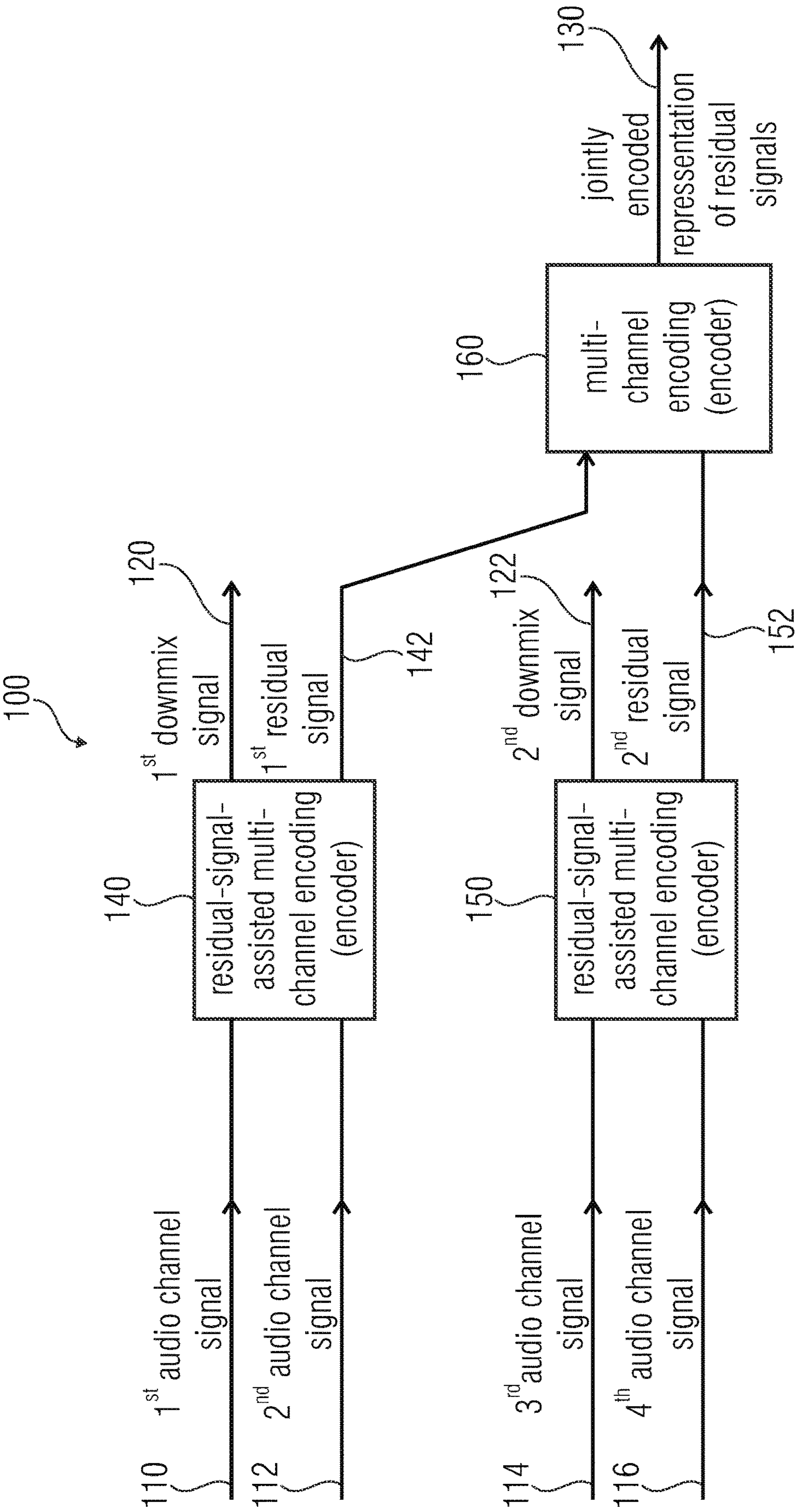
FIG. 1 shows a block schematic diagram of an audio encoder, according to an embodiment of the present invention.

FIG. 1 shows a block schematic diagram of an audio encoder, which is designated in its entirety with 100. The audio encoder 100 is configured to provide an encoded representation on the basis of at least four audio channel signals. The audio encoder 100 is configured to receive a first audio channel signal 110, a second audio channel signal 112, a third audio channel signal 114 and a fourth audio channel signal 116. Moreover, the audio encoder 100 is configured to provide an encoded representation of a first downmix signal 120 and of a second downmix signal 122, as well as a jointly-encoded representation 130 of residual signals. The audio encoder 100 comprises a residual-signal-assisted multi-channel encoder 140, which is configured to jointly-encode the first audio channel signal 110 and the second audio channel signal 112 using a residual-signal-assisted multi-channel encoding, to obtain the first downmix signal 120 and a first residual signal 142. The audio signal encoder 100 also comprises a residual-signal-assisted multi-channel encoder 150, which is configured to jointly-encode at least the third audio channel signal 114 and the fourth audio channel signal 116 using a residual-signal-assisted multi-channel encoding, to obtain the second downmix signal 122 and a second residual signal 152. The audio decoder 100 also comprises a multi-channel encoder 160, which is configured to jointly encode the first residual signal 142 and the second residual signal 152 using a multi-channel encoding, to obtain the jointly encoded representation 130 of the residual signals 142, 152.

Regarding the functionality of the audio encoder 100, it should be noted that the audio encoder 100 performs a hierarchical encoding, wherein the first audio channel signal 110 and the second audio channel signal 112 are jointly-encoded using the residual-signal-assisted multi-channel encoding 140, wherein both the first downmix signal 120 and the first residual signal 142 are provided. The first residual signal 142 may, for example, describe differences between the first audio channel signal 110 and the second audio channel signal 112, and/or may describe some or any signal features which cannot be represented by the first downmix signal 120 and optional parameters, which may be provided by the residual-signal-assisted multi-channel encoder 140. In other words, the first residual signal 142 may be a residual signal which allows for a refinement of a decoding result which may be obtained on the basis of the first downmix signal 120 and any possible parameters which may be provided by the residual-signal-assisted multi-channel encoder 140. For example, the first residual signal 142 may allow at least for a partial waveform reconstruction of the first audio channel signal 110 and of the second audio channel signal 112 at the side of an audio decoder when compared to a mere reconstruction of high-level signal characteristics (like, for example, correlation characteristics, covariance characteristics, level difference characteristics, and the like). Similarly, the residual-signal-assisted multi-channel encoder 150 provides both the second downmix signal 122 and the second residual signal 152 on the basis of the third audio channel signal 114 and the fourth audio channel signal 116, such that the second residual signal allows for a refinement of a signal reconstruction of the third audio channel signal 114 and of the fourth audio channel signal 116 at the side of an audio decoder. The second residual signal 152 may consequently serve the same functionality as the first residual signal 142. However, if the audio channel signals 110, 112, 114, 116 comprise some correlation, the first residual signal 142 and the second residual signal 152 are typically also correlated to some degree. Accordingly, the joint encoding of the first residual signal 142 and of the second residual signal 152 using the multi-channel encoder 160 typically comprises a high efficiency since a multi-channel encoding of correlated signals typically reduces the bitrate by exploiting the dependencies. Consequently, the first residual signal 142 and the second residual signal 152 can be encoded with good precision while keeping the bitrate of the jointly-encoded representation 130 of the residual signals reasonably small.

To summarize, the embodiment according to FIG. 1 provides a hierarchical multi-channel encoding, wherein a good reproduction quality can be achieved by using the residual-signal-assisted multi-channel encoders 140, 150, and wherein a bitrate demand can be kept moderate by jointly-encoding a first residual signal 142 and a second residual signal 152.

Further optional improvement of the audio encoder 100 is possible. Some of these improvements will be described taking reference to FIGS. 4, 11 and 12. However, it should be noted that the audio encoder 100 can also be adapted in parallel with the audio decoders described herein, wherein the functionality of the audio encoder is typically inverse to the functionality of the audio decoder.

2. Audio Decoder According to FIG. 2

Figure 2:
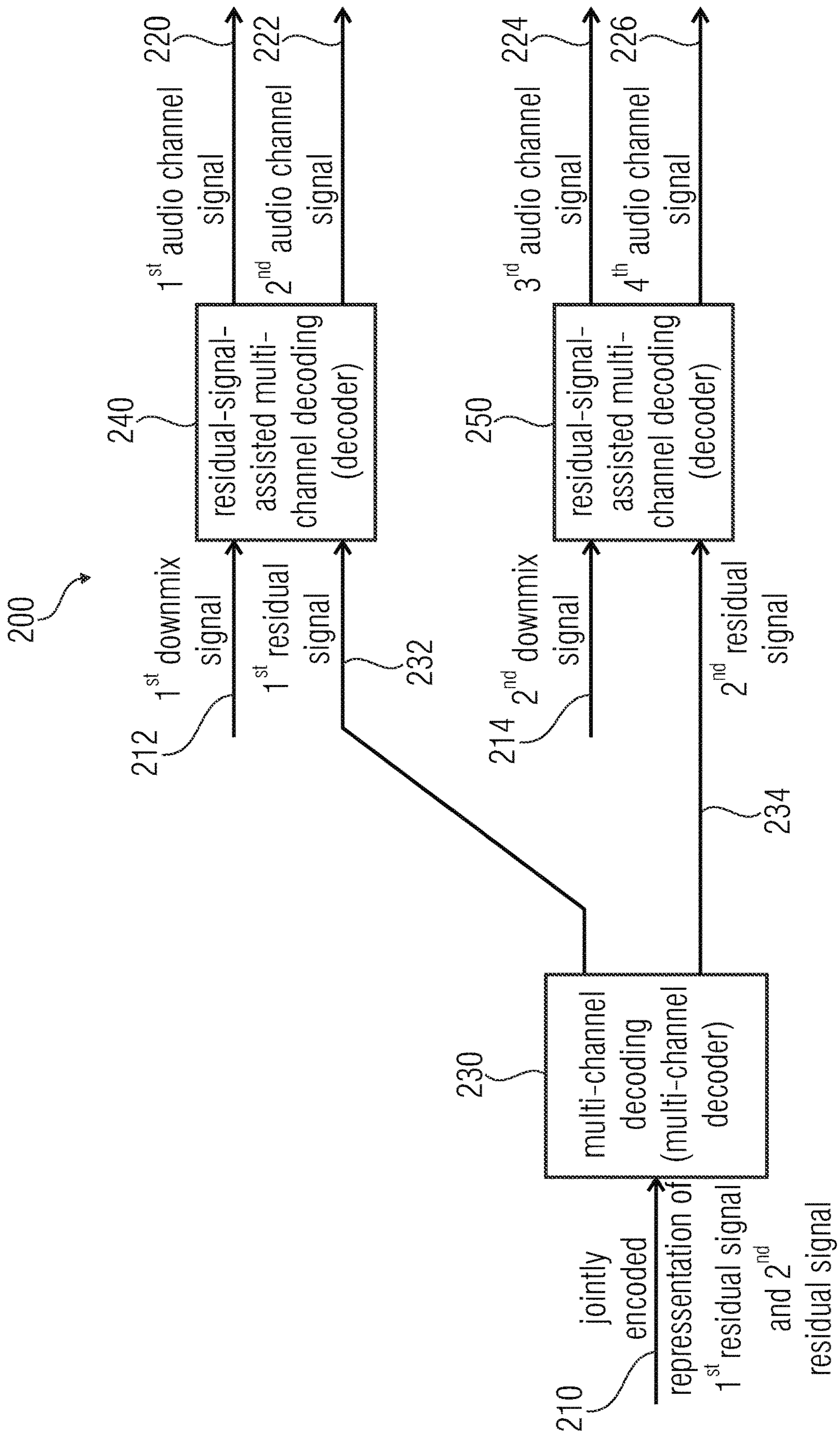
FIG. 2 shows a block schematic diagram of an audio decoder, according to an embodiment of the present invention.

FIG. 2 shows a block schematic diagram of an audio decoder, which is designated in its entirety with 200.

The audio decoder 200 is configured to receive an encoded representation which comprises a jointly-encoded representation 210 of a first residual signal and a second residual signal. The audio decoder 200 also receives a representation of a first downmix signal 212 and of a second downmix signal 214. The audio decoder 200 is configured to provide a first audio channel signal 220, a second audio channel signal 222, a third audio channel signal 224 and a fourth audio channel signal 226.

The audio decoder 200 comprises a multi-channel decoder 230, which is configured to provide a first residual signal 232 and a second residual signal 234 on the basis of the jointly-encoded representation 210 of the first residual signal 232 and of the second residual signal 234. The audio decoder 200 also comprises a (first) residual-signal-assisted multi-channel decoder 240 which is configured to provide the first audio channel signal 220 and the second audio channel signal 222 on the basis of the first downmix signal 212 and the first residual signal 232 using a multi-channel decoding. The audio decoder 200 also comprises a (second) residual-signal-assisted multi-channel decoder 250, which is configured to provide the third audio channel signal 224 and the fourth audio channel signal 226 on the basis of the second downmix signal 214 and the second residual signal 234.

Regarding the functionality of the audio decoder 200, it should be noted that the audio signal decoder 200 provides the first audio channel signal 220 and the second audio channel signal 222 on the basis of a (first) common residual-signal-assisted multi-channel decoding 240, wherein the decoding quality of the multi-channel decoding is increased by the first residual signal 232 (when compared to a non-residual-signal-assisted decoding). In other words, the first downmix signal 212 provides a "coarse" information about the first audio channel signal 220 and the second audio channel signal 222, wherein, for example, differences between the first audio channel signal 220 and the second audio channel signal 222 may be described by (optional) parameters, which may be received by the residual-signal-assisted multi-channel decoder 240 and by the first residual signal 232. Consequently, the first residual signal 232 may, for example, allow for a partial waveform reconstruction of the first audio channel signal 220 and of the second audio channel signal 222.

Similarly, the (second) residual-signal-assisted multi-channel decoder 250 provides the third audio channel signal 224 in the fourth audio channel signal 226 on the basis of the second downmix signal 214, wherein the second downmix signal 214 may, for example, "coarsely" describe the third audio channel signal 224 and the fourth audio channel signal 226. Moreover, differences between the third audio channel signal 224 and the fourth audio channel signal 226 may, for example, be described by (optional) parameters, which may be received by the (second) residual-signal-assisted multi-channel decoder 250 and by the second residual signal 234. Accordingly, the evaluation of the second residual signal 234 may, for example, allow for a partial waveform reconstruction of the third audio channel signal 224 and the fourth audio channel signal 226. Accordingly, the second residual signal 234 may allow for an enhancement of the quality of reconstruction of the third audio channel signal 224 and the fourth audio channel signal 226.

However, the first residual signal 232 and the second residual signal 234 are derived from a jointly-encoded representation 210 of the first residual signal and of the second residual signal. Such a multi-channel decoding, which is performed by the multi-channel decoder 230, allows for a high decoding efficiency since the first audio channel signal 220, the second audio channel signal 222, the third audio channel signal 224 and the fourth audio channel signal 226 are typically similar or "correlated". Accordingly, the first residual signal 232 and the second residual signal 234 are typically also similar or "correlated", which can be exploited by deriving the first residual signal 232 and the second residual signal 234 from a jointly-encoded representation 210 using a multi-channel decoding.

Consequently, it is possible to obtain a high decoding quality with moderate bitrate by decoding the residual signals 232, 234 on the basis of a jointly-encoded representation 210 thereof, and by using each of the residual signals for the decoding of two or more audio channel signals.

To conclude, the audio decoder 200 allows for a high coding efficiency by providing high quality audio channel signals 220, 222, 224, 226.

It should be noted that additional features and functionalities, which can be implemented optionally in the audio decoder 200, will be described subsequently taking reference to FIGS. 3, 5, 6 and 13. However, it should be noted that the audio encoder 200 may comprise the above-mentioned advantages without any additional modification.

3. Audio Decoder According to FIG. 3

Figure 3:
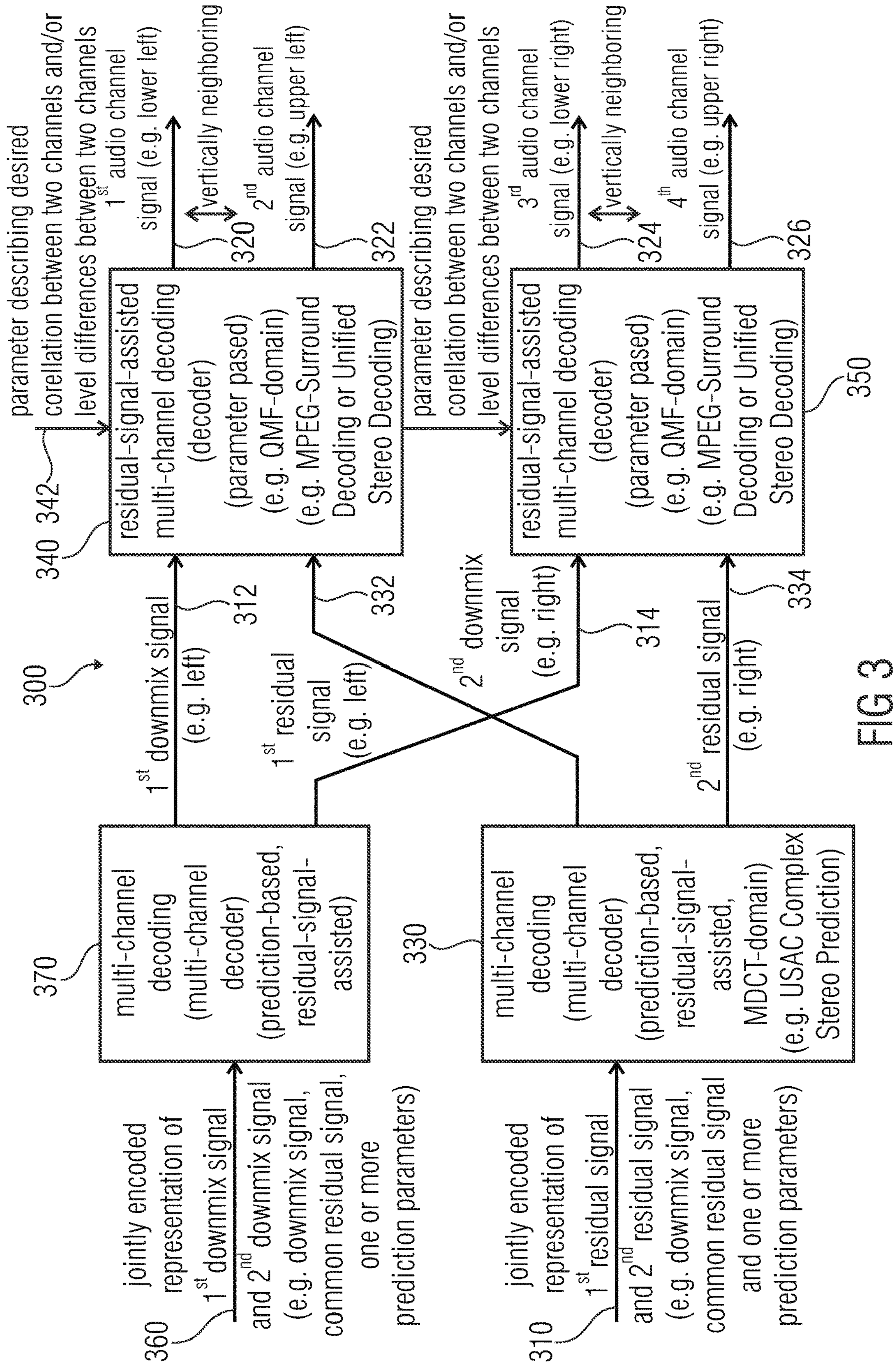
FIG. 3 shows a block schematic diagram of an audio decoder, according to another embodiment of the present invention.

FIG. 3 shows a block schematic diagram of an audio decoder according to another embodiment of the present invention. The audio decoder of FIG. 3 designated in its entirety with 300. The audio decoder 300 is similar to the audio decoder 200 according to FIG. 2, such that the above explanations also apply. However, the audio decoder 300 is supplemented with additional features and functionalities when compared to the audio decoder 200, as will be explained in the following.

The audio decoder 300 is configured to receive a jointly-encoded representation 310 of a first residual signal and of a second residual signal. Moreover, the audio decoder 300 is configured to receive a jointly-encoded representation 360 of a first downmix signal and of a second downmix signal. Moreover, the audio decoder 300 is configured to provide a first audio channel signal 320, a second audio channel signal 322, a third audio channel signal 324 and a fourth audio channel signal 326. The audio decoder 300 comprises a multi-channel decoder 330 which is configured to receive the jointly-encoded representation 310 of the first residual signal and of the second residual signal and to provide, on the basis thereof, a first residual signal 332 and a second residual signal 334. The audio decoder 300 also comprises a (first) residual-signal-assisted multi-channel decoding 340, which receives the first residual signal 332 and a first downmix signal 312, and provides the first audio channel signal 320 and the second audio channel signal 322. The audio decoder 300 also comprises a (second) residual-signal-assisted multi-channel decoding 350, which is configured to receive the second residual signal 334 and a second downmix signal 314, and to provide the third audio channel signal 324 and the fourth audio channel signal 326.

The audio decoder 300 also comprises another multi-channel decoder 370, which is configured to receive the jointly-encoded representation 360 of the first downmix signal and of the second downmix signal, and to provide, on the basis thereof, the first downmix signal 312 and the second downmix signal 314.

In the following, some further specific details of the audio decoder 300 will be described. However, it should be noted that an actual audio decoder does not need to implement a combination of all these additional features and functionalities. Rather, the features and functionalities described in the following can be individually added to the audio decoder 200 (or any other audio decoder), to gradually improve the audio decoder 200 (or any other audio decoder).

In an advantageous embodiment, the audio decoder 300 receives a jointly-encoded representation 310 of the first residual signal and the second residual signal, wherein this jointly-encoded representation 310 may comprise a downmix signal of the first residual signal 332 and of the second residual signal 334, and a common residual signal of the first residual signal 332 and the second residual signal 334. In addition, the jointly-encoded representation 310 may, for example, comprise one or more prediction parameters. Accordingly, the multi-channel decoder 330 may be a prediction-based, residual-signal-assisted multi-channel decoder. For example, the multi-channel decoder 330 may be a USAC complex stereo prediction, as described, for example, in the section "Complex Stereo Prediction" of the international standard ISO/IEC 23003-3:2012. For example, the multi-channel decoder 330 may be configured to evaluate a prediction parameter describing a contribution of a signal component, which is derived using a signal component of a previous frame, to a provision of the first residual signal 332 and the second residual signal 334 for a current frame. Moreover, the multi-channel decoder 330 may be configured to apply the common residual signal (which is included in the jointly-encoded representation 310) with a first sign, to obtain the first residual signal 332, and to apply the common residual signal (which is included in the jointly-encoded representation 310) with a second sign, which is opposite to the first sign, to obtain the second residual signal 334. Thus, the common residual signal may, at least partly, describe differences between the first residual signal 332 and the second residual signal 334. However, the multi-channel decoder 330 may evaluate the downmix signal, the common residual signal and the one or more prediction parameters, which are all included in the jointly-encoded representation 310, to obtain the first residual signal 332 and the second residual signal 334 as described in the above-referenced international standard ISO/IEC 23003-3:2012. Moreover, it should be noted that the first residual signal 332 may be associated with a first horizontal position (or azimuth position), for example, a left horizontal position, and that the second residual signal 334 may be associated with a second horizontal position (or azimuth position), for example a right horizontal position, of an audio scene.

The jointly-encoded representation 360 of the first downmix signal and of the second downmix signal advantageously comprises a downmix signal of the first downmix signal and of the second downmix signal, a common residual signal of the first downmix signal and of the second downmix signal, and one or more prediction parameters. In other words, there is a "common" downmix signal, into which the first downmix signal 312 and the second downmix signal 314 are downmixed, and there is a "common" residual signal which may describe, at least partly, differences between the first downmix signal 312 and the second downmix signal 314. The multi-channel decoder 370 is advantageously a prediction-based, residual-signal-assisted multi-channel decoder, for example, a USAC complex stereo prediction decoder. In other words, the multi-channel decoder 370, which provides the first downmix signal 312 and the second downmix signal 314 may be substantially identical to the multi-channel decoder 330, which provides the first residual signal 332 and the second residual signal 334, such that the above explanations and references also apply. Moreover, it should be noted that the first downmix signal 312 is advantageously associated with a first horizontal position or azimuth position (for example, left horizontal position or azimuth position) of the audio scene, and that the second downmix signal 314 is advantageously associated with a second horizontal position or azimuth position (for example, right horizontal position or azimuth position) of the audio scene. Accordingly, the first downmix signal 312 and the first residual signal 332 may be associated with the same, first horizontal position or azimuth position (for example, left horizontal position), and the second downmix signal 314 and the second residual signal 334 may be associated with the same, second horizontal position or azimuth position (for example, right horizontal position). Accordingly, both the multi-channel decoder 370 and the multi-channel decoder 330 may perform a horizontal splitting (or horizontal separation or horizontal distribution).

The residual-signal-assisted multi-channel decoder 340 may advantageously be parameter-based, and may consequently receive one or more parameters 342 describing a desired correlation between two channels (for example, between the first audio channel signal 320 and the second audio channel signal 322) and/or level differences between said two channels. For example, the residual-signal-assisted multi-channel decoding 340 may be based on an MPEG-Surround coding (as described, for example, in ISO/IEC 23003-1:2007) with a residual signal extension or a "unified stereo decoding" decoder (as described, for example in ISO/IEC 23003-3, chapter 7.11 (Decoder) & Annex B.21 (Description of the Encoder & Definition of the Term "Unified Stereo")). Accordingly, the residual-signal-assisted multi-channel decoder 340 may provide the first audio channel signal 320 and the second audio channel signal 322, wherein the first audio channel signal 320 and the second audio channel signal 322 are associated with vertically neighboring positions of the audio scene. For example, the first audio channel signal may be associated with a lower left position of the audio scene, and the second audio channel signal may be associated with an upper left position of the audio scene (such that the first audio channel signal 320 and the second audio channel signal 322 are, for example, associated with identical horizontal positions or azimuth positions of the audio scene, or with azimuth positions separated by no more than 30 degrees). In other words, the residual-signal-assisted multi-channel decoder 340 may perform a vertical splitting (or distribution, or separation).

The functionality of the residual-signal-assisted multi-channel decoder 350 may be identical to the functionality of the residual-signal-assisted multi-channel decoder 340, wherein the third audio channel signal may, for example, be associated with a lower right position of the audio scene, and wherein the fourth audio channel signal may, for example, be associated with an upper right position of the audio scene. In other words, the third audio channel signal and the fourth audio channel signal may be associated with vertically neighboring positions of the audio scene, and may be associated with the same horizontal position or azimuth position of the audio scene, wherein the residual-signal-assisted multi-channel decoder 350 performs a vertical splitting (or separation, or distribution).

To summarize, the audio decoder 300 according to FIG. 3 performs a hierarchical audio decoding, wherein a left-right splitting is performed in the first stages (multi-channel decoder 330, multi-channel decoder 370), and wherein an upper-lower splitting is performed in the second stage (residual-signal-assisted multi-channel decoders 340, 350). Moreover, the residual signals 332, 334 are also encoded using a jointly-encoded representation 310, as well as the downmix signals 312, 314 (jointly-encoded representation 360). Thus, correlations between the different channels are exploited both for the encoding (and decoding) of the downmix signals 312, 314 and for the encoding (and decoding) of the residual signals 332, 334. Accordingly, a high coding efficiency is achieved, and the correlations between the signals are well exploited.

4. Audio Encoder According to FIG. 4

Figure 4:
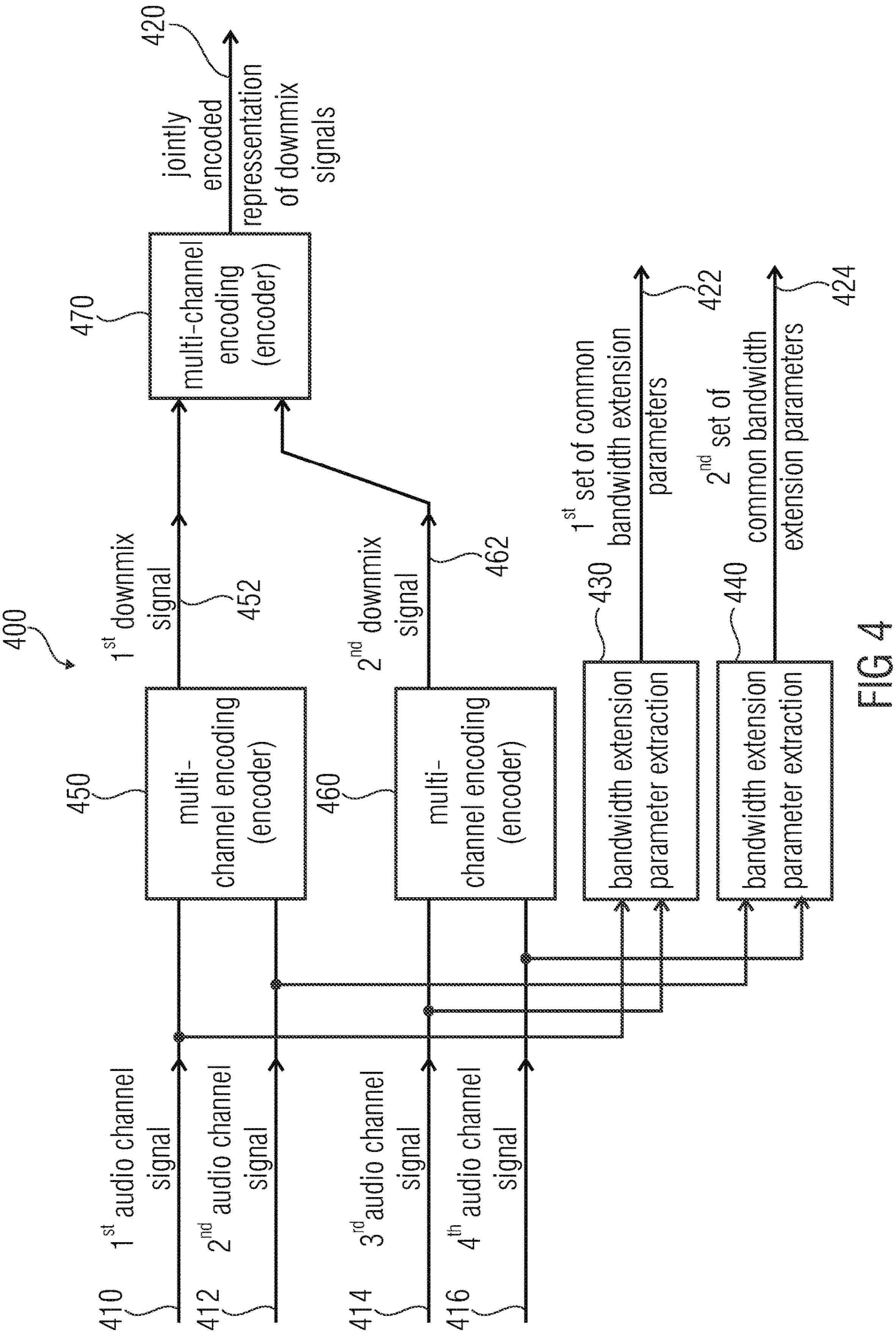
FIG. 4 shows a block schematic diagram of an audio encoder, according to an embodiment of the present invention.

FIG. 4 shows a block schematic diagram of an audio encoder, according to another embodiment of the present invention. The audio encoder according to FIG. 4 is designated in its entirety with 400. The audio encoder 400 is configured to receive four audio channel signals, namely a first audio channel signal 410, a second audio channel signal 412, a third audio channel signal 414 and a fourth audio channel signal 416. Moreover, the audio encoder 400 is configured to provide an encoded representation on the basis of the audio channel signals 410, 412, 414 and 416, wherein said encoded representation comprises a jointly encoded representation 420 of two downmix signals, as well as an encoded representation of a first set 422 of common bandwidth extension parameters and of a second set 424 of common bandwidth extension parameters. The audio encoder 400 comprises a first bandwidth extension parameter extractor 430, which is configured to obtain the first set 422 of common bandwidth extraction parameters on the basis of the first audio channel signal 410 and the third audio channel signal 414. The audio encoder 400 also comprises a second bandwidth extension parameter extractor 440, which is configured to obtain the second set 424 of common bandwidth extension parameters on the basis of the second audio channel signal 412 and the fourth audio channel signal 416.

Moreover, the audio encoder 400 comprises a (first) multi-channel encoder 450, which is configured to jointly-encode at least the first audio channel signal 410 and the second audio channel signal 412 using a multi-channel encoding, to obtain a first downmix signal 452. Further, the audio encoder 400 also comprises a (second) multi-channel encoder 460, which is configured to jointly-encode at least the third audio channel signal 414 and the fourth audio channel signal 416 using a multi-channel encoding, to obtain a second downmix signal 462. Further, the audio encoder 400 also comprises a (third) multi-channel encoder 470, which is configured to jointly-encode the first downmix signal 452 and the second downmix signal 462 using a multi-channel encoding, to obtain the jointly-encoded representation 420 of the downmix signals.

Regarding the functionality of the audio encoder 400, it should be noted that the audio encoder 400 performs a hierarchical multi-channel encoding, wherein the first audio channel signal 410 and the second audio channel signal 412 are combined in a first stage, and wherein the third audio channel signal 414 and the fourth audio channel signal 416 are also combined in the first stage, to thereby obtain the first downmix signal 452 and the second downmix signal 462. The first downmix signal 452 and the second downmix signal 462 are then jointly encoded in a second stage. However, it should be noted that the first bandwidth extension parameter extractor 430 provides the first set 422 of common bandwidth extraction parameters on the basis of audio channel signals 410, 414 which are handled by different multi-channel encoders 450, 460 in the first stage of the hierarchical multi-channel encoding. Similarly, the second bandwidth extension parameter extractor 440 provides a second set 424 of common bandwidth extraction parameters on the basis of different audio channel signals 412, 416, which are handled by different multi-channel encoders 450, 460 in the first processing stage. This specific processing order brings along the advantage that the sets 422, 424 of bandwidth extension parameters are based on channels which are only combined in the second stage of the hierarchical encoding (i.e., in the multi-channel encoder 470). This is advantageous, since it is desirable to combine such audio channels in the first stage of the hierarchical encoding, the relationship of which is not highly relevant with respect to a sound source position perception. Rather, it is recommendable that the relationship between the first downmix signal and the second downmix signal mainly determines a sound source location perception, because the relationship between the first downmix signal 452 and the second downmix signal 462 can be maintained better than the relationship between the individual audio channel signals 410, 412, 414, 416. Worded differently, it has been found that it is desirable that the first set 422 of common bandwidth extension parameters is based on two audio channels (audio channel signals) which contribute to different of the downmix signals 452, 462, and that the second set 424 of common bandwidth extension parameters is provided on the basis of audio channel signals 412, 416, which also contribute to different of the downmix signals 452, 462, which is reached by the above-described processing of the audio channel signals in the hierarchical multi-channel encoding. Consequently, the first set 422 of common bandwidth extension parameters is based on a similar channel relationship when compared to the channel relationship between the first downmix signal 452 and the second downmix signal 462, wherein the latter typically dominates the spatial impression generated at the side of an audio decoder. Accordingly, the provision of the first set 422 of bandwidth extension parameters, and also the provision of the second set 424 of bandwidth extension parameters is well-adapted to a spatial hearing impression which is generated at the side of an audio decoder.

5. Audio Decoder According to FIG. 5

Figure 5:
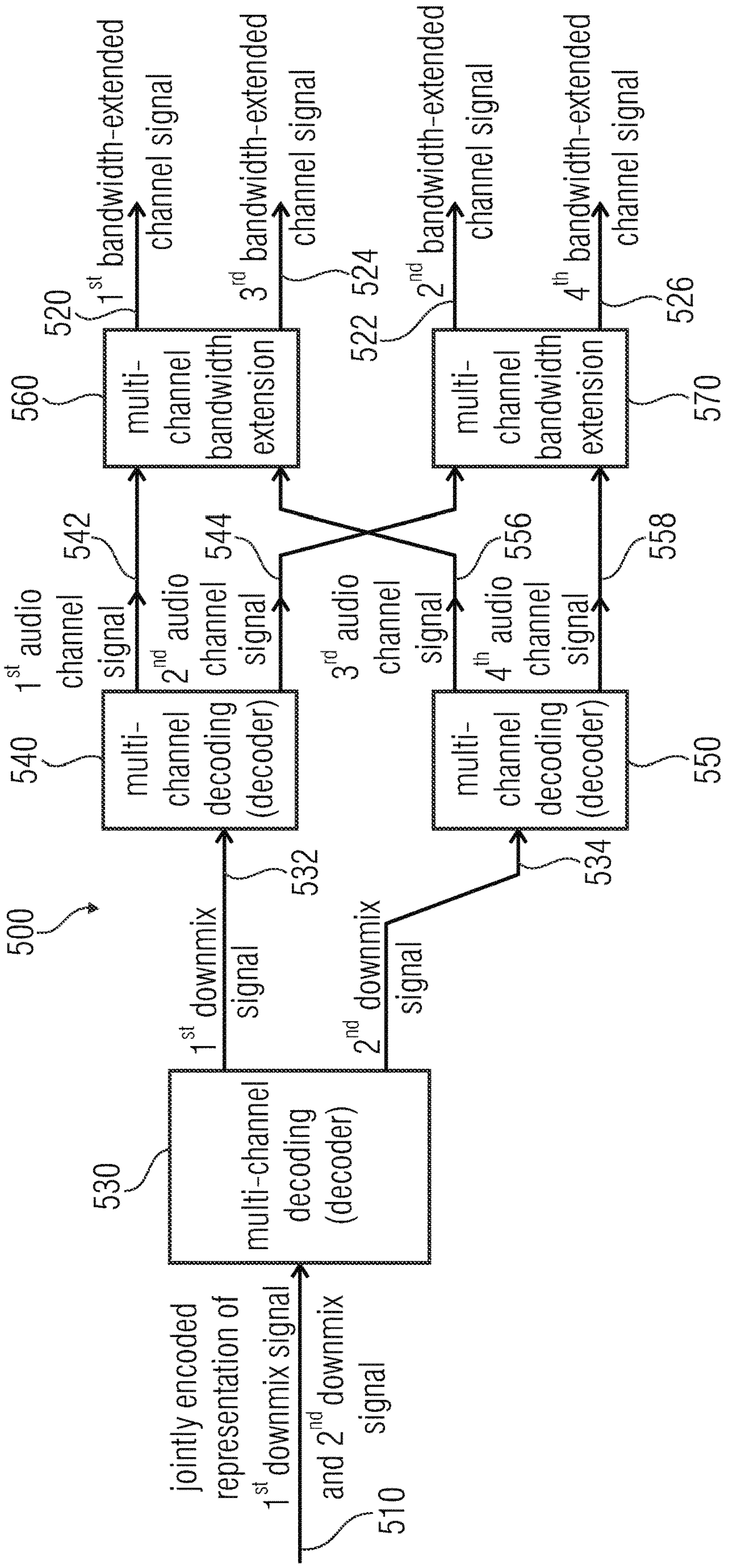
FIG. 5 shows a block schematic diagram of an audio decoder, according to an embodiment of the present invention.

FIG. 5 shows a block schematic diagram of an audio decoder, according to another embodiment of the present invention. The audio decoder according to FIG. 5 is designated in its entirety with 500.

The audio decoder 500 is configured to receive a jointly-encoded representation 510 of a first downmix signal and a second downmix signal. Moreover, the audio decoder 500 is configured to provide a first bandwidth-extended channel signal 520, a second bandwidth extended channel signal 522, a third bandwidth-extended channel signal 524 and a fourth bandwidth-extended channel signal 526.

The audio decoder 500 comprises a (first) multi-channel decoder 530, which is configured to provide a first downmix signal 532 and a second downmix signal 534 on the basis of the jointly-encoded representation 510 of the first downmix signal and the second downmix signal using a multi-channel decoding. The audio decoder 500 also comprises a (second) multi-channel decoder 540, which is configured to provide at least a first audio channel signal 542 and a second audio channel signal 544 on the basis of the first downmix signal 532 using a multi-channel decoding. The audio decoder 500 also comprises a (third) multi-channel decoder 550, which is configured to provide at least a third audio channel signal 556 and a fourth audio channel signal 558 on the basis of the second downmix signal 544 using a multi-channel decoding. Moreover, the audio decoder 500 comprises a (first) multi-channel bandwidth extension 560, which is configured to perform a multi-channel bandwidth extension on the basis of the first audio channel signal 542 and the third audio channel signal 556, to obtain a first bandwidth-extended channel signal 520 and the third bandwidth-extended channel signal 524. Moreover, the audio decoder comprises a (second) multi-channel bandwidth extension 570, which is configured to perform a multi-channel bandwidth extension on the basis of the second audio channel signal 544 and the fourth audio channel signal 558, to obtain the second bandwidth-extended channel signal 522 and the fourth bandwidth-extended channel signal 526.

Regarding the functionality of the audio decoder 500, it should be noted that the audio decoder 500 performs a hierarchical multi-channel decoding, wherein a splitting between a first downmix signal 532 and a second downmix signal 534 is performed in a first stage of the hierarchical decoding, and wherein the first audio channel signal 542 and the second audio channel signal 544 are derived from the first downmix signal 532 in a second stage of the hierarchical decoding, and wherein the third audio channel signal 556 and the fourth audio channel signal 558 are derived from the second downmix signal 550 in the second stage of the hierarchical decoding. However, both the first multi-channel bandwidth extension 560 and the second multi-channel bandwidth extension 570 each receive one audio channel signal which is derived from the first downmix signal 532 and one audio channel signal which is derived from the second downmix signal 534. Since a better channel separation is typically achieved by the (first) multi-channel decoding 530, which is performed as a first stage of the hierarchical multi-channel decoding, when compared to the second stage of the hierarchical decoding, it can be seen that each multi-channel bandwidth extension 560, 570 receives input signals which are well-separated (because they originate from the first downmix signal 532 and the second downmix signal 534, which are well-channel-separated). Thus, the multi-channel bandwidth extension 560, 570 can consider stereo characteristics, which are important for a hearing impression, and which are well-represented by the relationship between the first downmix signal 532 and the second downmix signal 534, and can therefore provide a good hearing impression.

In other words, the "cross" structure of the audio decoder, wherein each of the multi-channel bandwidth extension stages 560, 570 receives input signals from both (second stage) multi-channel decoders 540, 550 allows for a good multi-channel bandwidth extension, which considers a stereo relationship between the channels.

However, it should be noted that the audio decoder 500 can be supplemented by any of the features and functionalities described herein with respect to the audio decoders according to FIGS. 2, 3, 6 and 13, wherein it is possible to introduce individual features into the audio decoder 500 to gradually improve the performance of the audio decoder.

6. Audio Decoder According to FIG. 6A and FIG. 6B

Figure 6A:
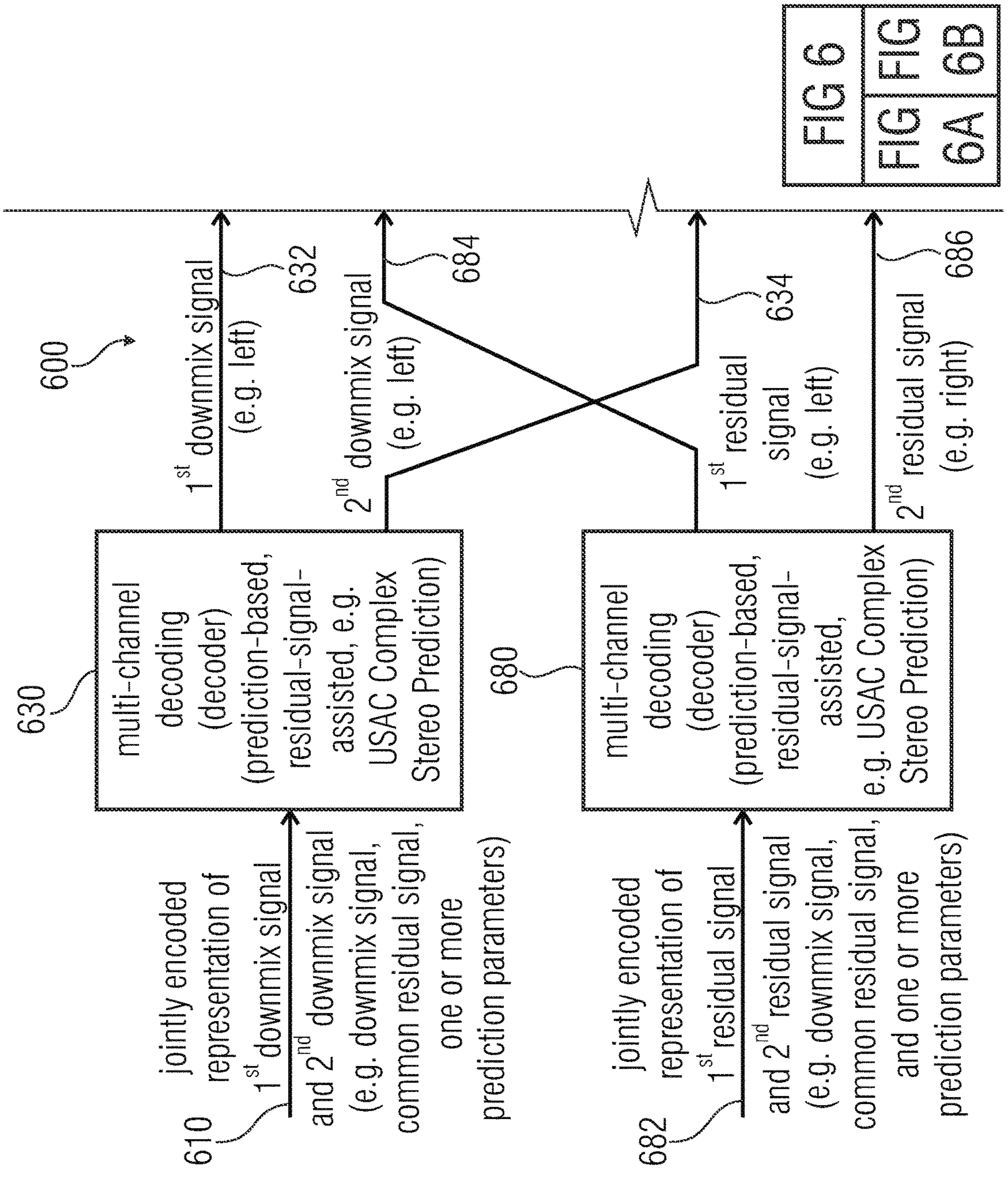
FIG. 6A shows a block schematic diagram of an audio decoder, according to another embodiment of the present invention.
Figure 6B:
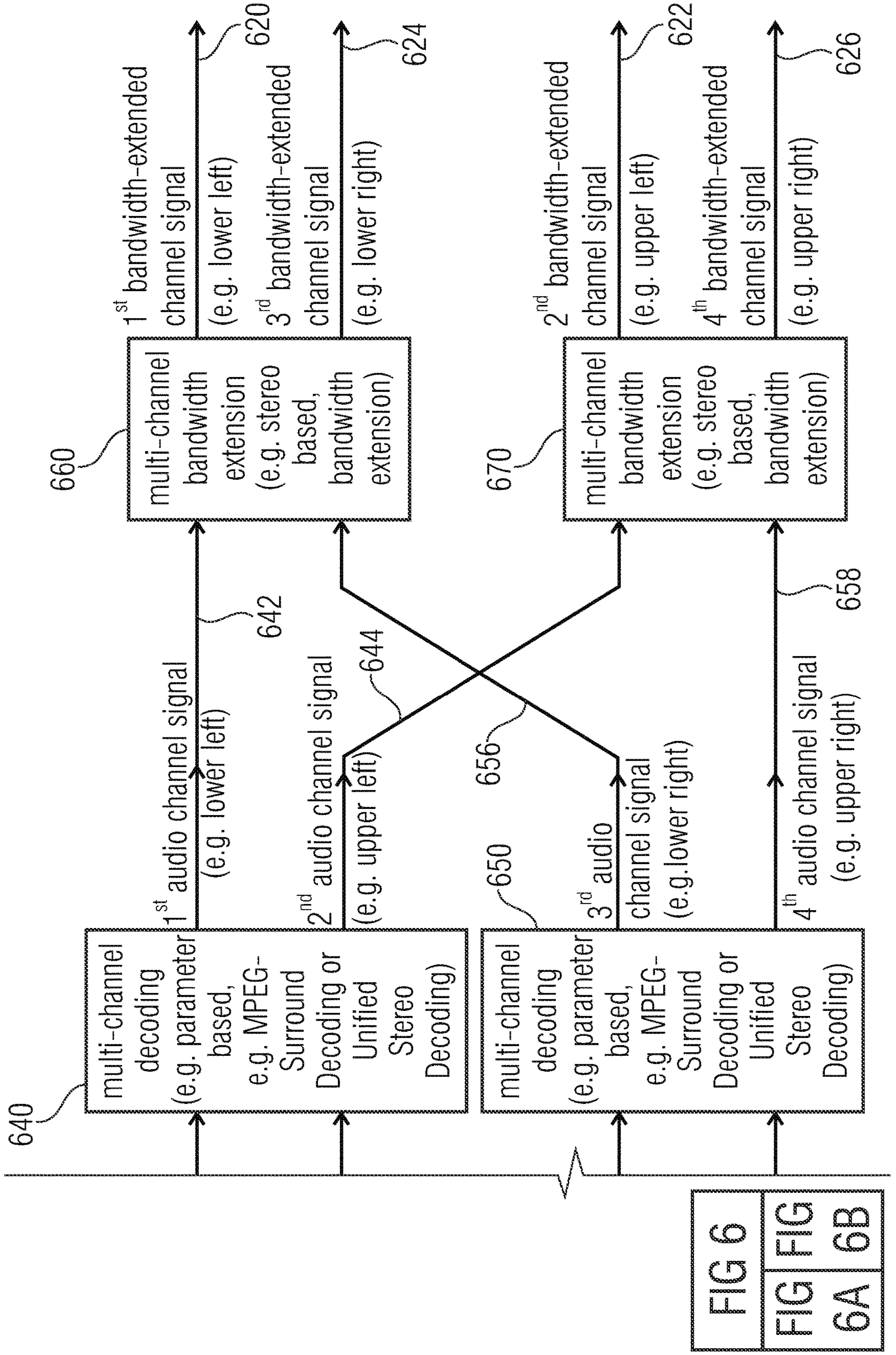
FIG. 6B shows a block schematic diagram of an audio decoder, according to another embodiment of the present invention.

FIG. 6A and FIG. 6B shows a block schematic diagram of an audio decoder according to another embodiment of the present invention. The audio decoder according to FIG. 6A and FIG. 6B are designated in its entirety with 600. The audio decoder 600 according to FIGS. 6A and 6B are similar to the audio decoder 500 according to FIG. 5, such that the above explanations also apply. However, the audio decoder 600 has been supplemented by some features and functionalities, which can also be introduced, individually or in combination, into the audio decoder 500 for improvement.

The audio decoder 600 is configured to receive a jointly encoded representation 610 of a first downmix signal and of a second downmix signal and to provide a first bandwidth-extended signal 620, a second bandwidth extended signal 622, a third bandwidth extended signal 624 and a fourth bandwidth extended signal 626. The audio decoder 600 comprises a multi-channel decoder 630, which is configured to receive the jointly encoded representation 610 of the first downmix signal and of the second downmix signal, and to provide, on the basis thereof, the first downmix signal 632 and the second downmix signal 634. The audio decoder 600 further comprises a multi-channel decoder 640, which is configured to receive the first downmix signal 632 and to provide, on the basis thereof, a first audio channel signal 542 and a second audio channel signal 544. The audio decoder 600 also comprises a multi-channel decoder 650, which is configured to receive the second downmix signal 634 and to provide a third audio channel signal 656 and a fourth audio channel signal 658. The audio decoder 600 also comprises a (first) multi-channel bandwidth extension 660, which is configured to receive the first audio channel signal 642 and the third audio channel signal 656 and to provide, on the basis thereof, the first bandwidth extended channel signal 620 and the third bandwidth extended channel signal 624. Also, a (second) multi-channel bandwidth extension 670 receives the second audio channel signal 644 and the fourth audio channel signal 658 and provides, on the basis thereof, the second bandwidth extended channel signal 622 and the fourth bandwidth extended channel signal 626.

The audio decoder 600 also comprises a further multi-channel decoder 680, which is configured to receive a jointly-encoded representation 682 of a first residual signal and of a second residual signal and which provides, on the basis thereof, a first residual signal 684 for usage by the multi-channel decoder 640 and a second residual signal 686 for usage by the multi-channel decoder 650.

The multi-channel decoder 630 is advantageously a prediction-based residual-signal-assisted multi-channel decoder. For example, the multi-channel decoder 630 may be substantially identical to the multi-channel decoder 370 described above. For example, the multi-channel decoder 630 may be a USAC complex stereo predication decoder, as mentioned above, and as described in the USAC standard referenced above. Accordingly, the jointly encoded representation 610 of the first downmix signal and of the second downmix signal may, for example, comprise a (common) downmix signal of the first downmix signal and of the second downmix signal, a (common) residual signal of the first downmix signal and of the second downmix signal, and one or more prediction parameters, which are evaluated by the multi-channel decoder 630.

Moreover, it should be noted that the first downmix signal 632 may, for example, be associated with a first horizontal position or azimuth position (for example, a left horizontal position) of an audio scene and that the second downmix signal 634 may, for example, be associated with a second horizontal position or azimuth position (for example, a right horizontal position) of the audio scene.

Moreover, the multi-channel decoder 680 may, for example, be a prediction-based, residual-signal-associated multi-channel decoder. The multi-channel decoder 680 may be substantially identical to the multi-channel decoder 330 described above. For example, the multi-channel decoder 680 may be a USAC complex stereo prediction decoder, as mentioned above. Consequently, the jointly encoded representation 682 of the first residual signal and of the second residual signal may comprise a (common) downmix signal of the first residual signal and of the second residual signal, a (common) residual signal of the first residual signal and of the second residual signal, and one or more prediction parameters, which are evaluated by the multi-channel decoder 680. Moreover, it should be noted that the first residual signal 684 may be associated with a first horizontal position or azimuth position (for example, a left horizontal position) of the audio scene, and that the second residual signal 686 may be associated with a second horizontal position or azimuth position (for example, a right horizontal position) of the audio scene.

The multi-channel decoder 640 may, for example, be a parameter-based multi-channel decoding like, for example, an MPEG surround multi-channel decoding, as described above and in the referenced standard. However, in the presence of the (optional) multi-channel decoder 680 and the (optional) first residual signal 684, the multi-channel decoder 640 may be a parameter-based, residual-signal-assisted multi-channel decoder, like, for example, a unified stereo decoder. Thus, the multi-channel decoder 640 may be substantially identical to the multi-channel decoder 340 described above, and the multi-channel decoder 640 may, for example, receive the parameters 342 described above.

Similarly, the multi-channel decoder 650 may be substantially identical to the multi-channel decoder 640. Accordingly, the multi-channel decoder 650 may, for example, be parameter based and may optionally be residual-signal assisted (in the presence of the optional multi-channel decoder 680).

Moreover, it should be noted that the first audio channel signal 642 and the second audio channel signal 644 are advantageously associated with vertically adjacent spatial positions of the audio scene. For example, the first audio channel signal 642 is associated with a lower left position of the audio scene and the second audio channel signal 644 is associated with an upper left position of the audio scene. Accordingly, the multi-channel decoder 640 performs a vertical splitting (or separation or distribution) of the audio content described by the first downmix signal 632 (and, optionally, by the first residual signal 684). Similarly, the third audio channel signal 656 and the fourth audio channel signal 658 are associated with vertically adjacent positions of the audio scene, and are advantageously associated with the same horizontal position or azimuth position of the audio scene. For example, the third audio channel signal 656 is advantageously associated with a lower right position of the audio scene and the fourth audio channel signal 658 is advantageously associated with an upper right position of the audio scene. Thus, the multi-channel decoder 650 performs a vertical splitting (or separation, or distribution) of the audio content described by the second downmix signal 634 (and, optionally, the second residual signal 686).

However, the first multi-channel bandwidth extension 660 receives the first audio channel signal 642 and the third audio channel 656, which are associated with the lower left position and a lower right position of the audio scene. Accordingly, the first multi-channel bandwidth extension 660 performs a multi-channel bandwidth extension on the basis of two audio channel signals which are associated with the same horizontal plane (for example, lower horizontal plane) or elevation of the audio scene and different sides (left/right) of the audio scene. Accordingly, the multi-channel bandwidth extension can consider stereo characteristics (for example, the human stereo perception) when performing the bandwidth extension. Similarly, the second multi-channel bandwidth extension 670 may also consider stereo characteristics, since the second multi-channel bandwidth extension operates on audio channel signals of the same horizontal plane (for example, upper horizontal plane) or elevation but at different horizontal positions (different sides) (left/right) of the audio scene.

To further conclude, the hierarchical audio decoder 600 comprises a structure wherein a left/right splitting (or separation, or distribution) is performed in a first stage (multi-channel decoding 630, 680), wherein a vertical splitting (separation or distribution) is performed in a second stage (multi-channel decoding 640, 650), and wherein the multi-channel bandwidth extension operates on a pair of left/right signals (multi-channel bandwidth extension 660, 670). This "crossing" of the decoding pathes allows that left/right separation, which is particularly important for the hearing impression (for example, more important than the upper/lower splitting) can be performed in the first processing stage of the hierarchical audio decoder and that the multi-channel bandwidth extension can also be performed on a pair of left-right audio channel signals, which again results in a particularly good hearing impression. The upper/lower splitting is performed as an intermediate stage between the left-right separation and the multi-channel bandwidth extension, which allows to derive four audio channel signals (or bandwidth-extended channel signals) without significantly degrading the hearing impression.

7. Method According to FIG. 7

Figure 7:
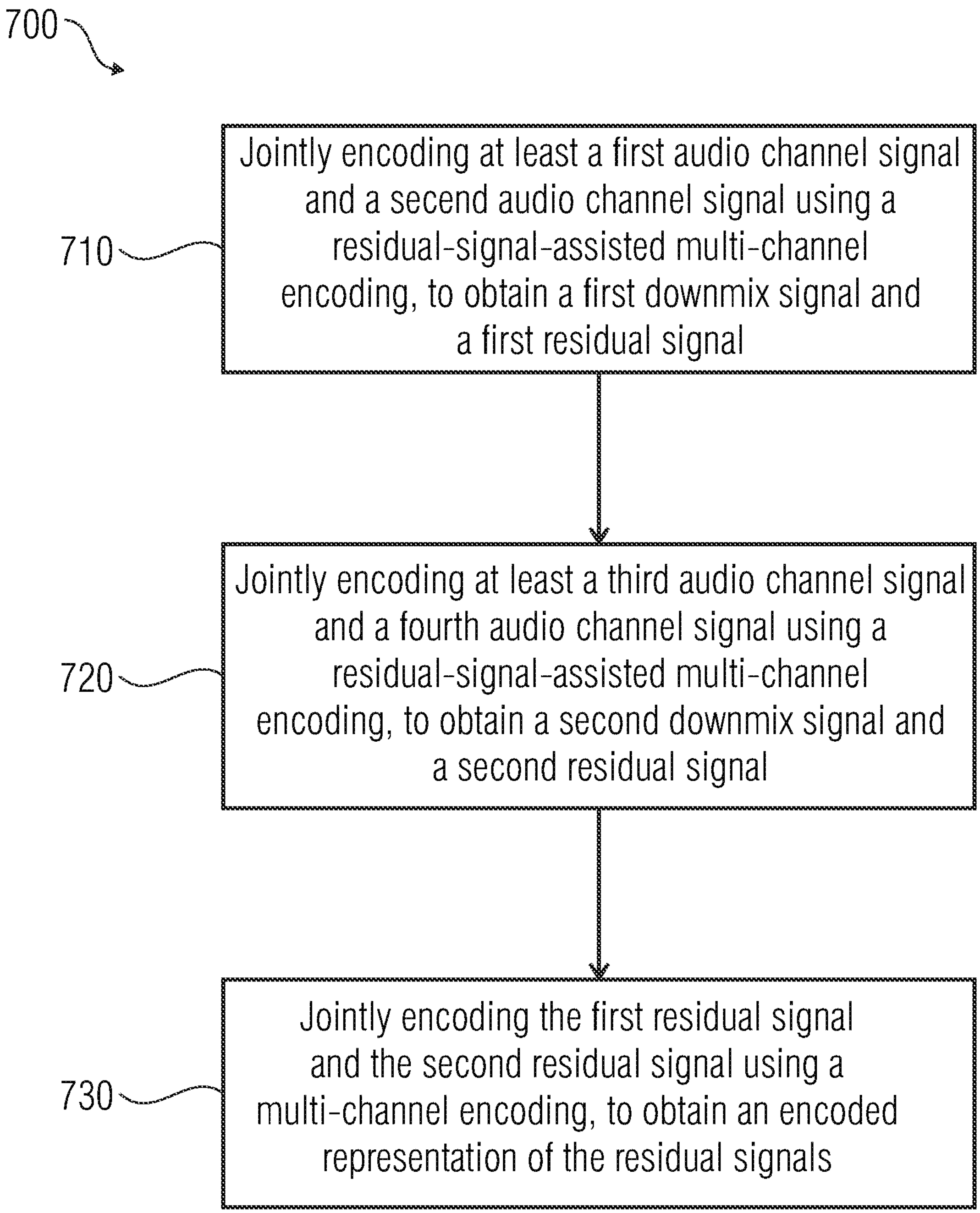
FIG. 7 shows a flowchart of a method for providing an encoded representation on the basis of at least four audio channel signals, according to an embodiment of the present invention.

FIG. 7 shows a flow chart of a method 700 for providing an encoded representation on the basis of at least four audio channel signals.

The method 700 comprises jointly encoding 710 at least a first audio channel signal and a second audio channel signal using a residual-signal-assisted multi-channel encoding, to obtain a first downmix signal and a first residual signal. The method also comprises jointly encoding 720 at least a third audio channel signal and a fourth audio channel signal using a residual-signal-assisted multi-channel encoding, to obtain a second downmix signal and a second residual signal. The method further comprises jointly encoding 730 the first residual signal and the second residual signal using a multi-channel encoding, to obtain an encoded representation of the residual signals. However, it should be noted that the method 700 can be supplemented by any of the features and functionalities described herein with respect to the audio encoders and audio decoders.

8. Method According to FIG. 8

Figure 8:
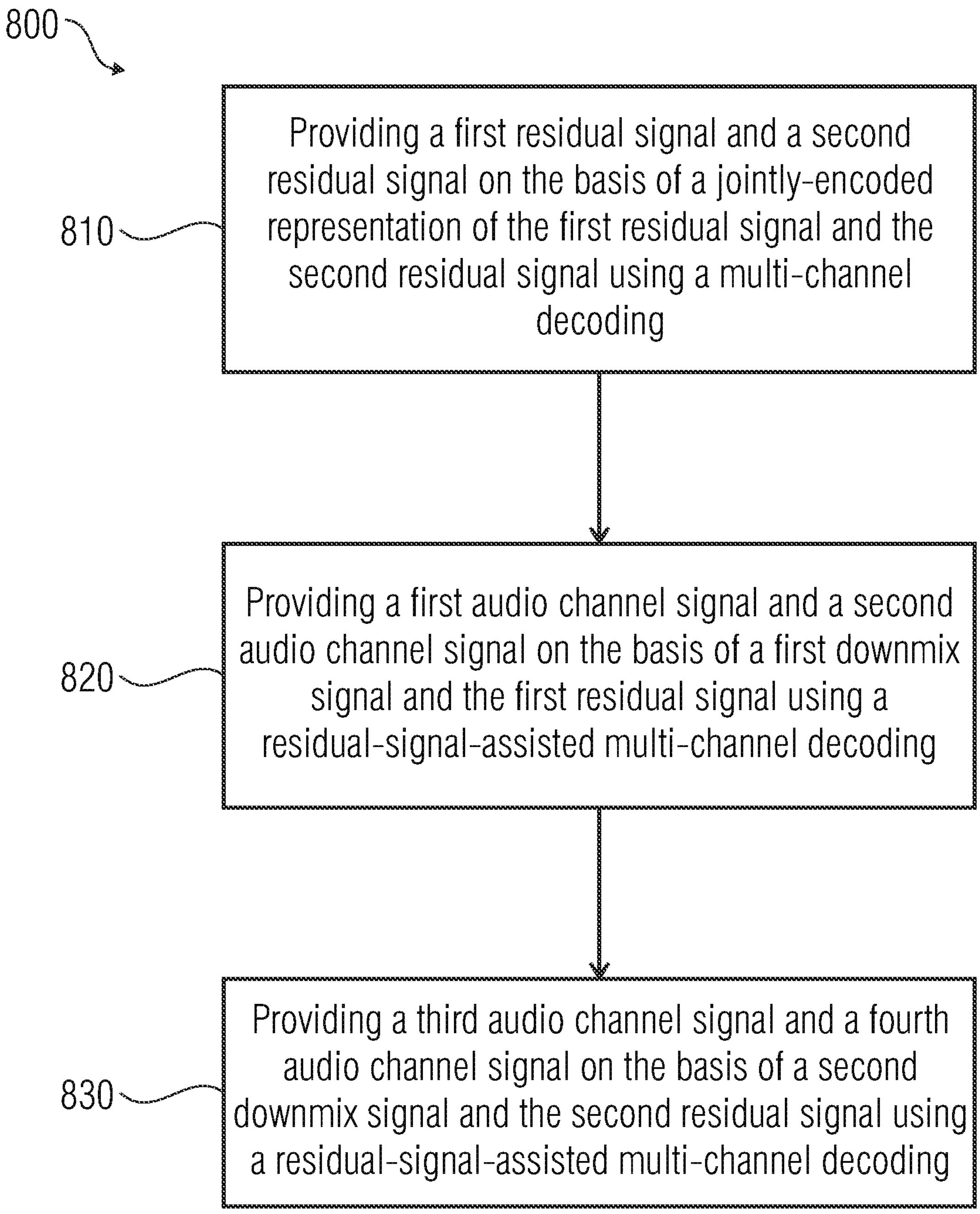
FIG. 8 shows a flowchart of a method for providing at least four audio channel signals on the basis of an encoded representation, according to an embodiment of the invention.

FIG. 8 shows a flow chart of a method 800 for providing at least four audio channel signals on the basis of an encoded representation.

The method 800 comprises providing 810 a first residual signal and a second residual signal on the basis of a jointly-encoded representation of the first residual signal and the second residual signal using a multi-channel decoding. The method 800 also comprises providing 820 a first audio channel signal and a second audio channel signal on the basis of a first downmix signal and the first residual signal using a residual-signal-assisted multi-channel decoding. The method also comprises providing 830 a third audio channel signal and a fourth audio channel signal on the basis of a second downmix signal and the second residual signal using a residual-signal-assisted multi-channel decoding.

Moreover, it should be noted that the method 800 can be supplemented by any of the features and functionalities described herein with respect to the audio decoders and audio encoders.

9. Method According to FIG. 9

Figure 9:
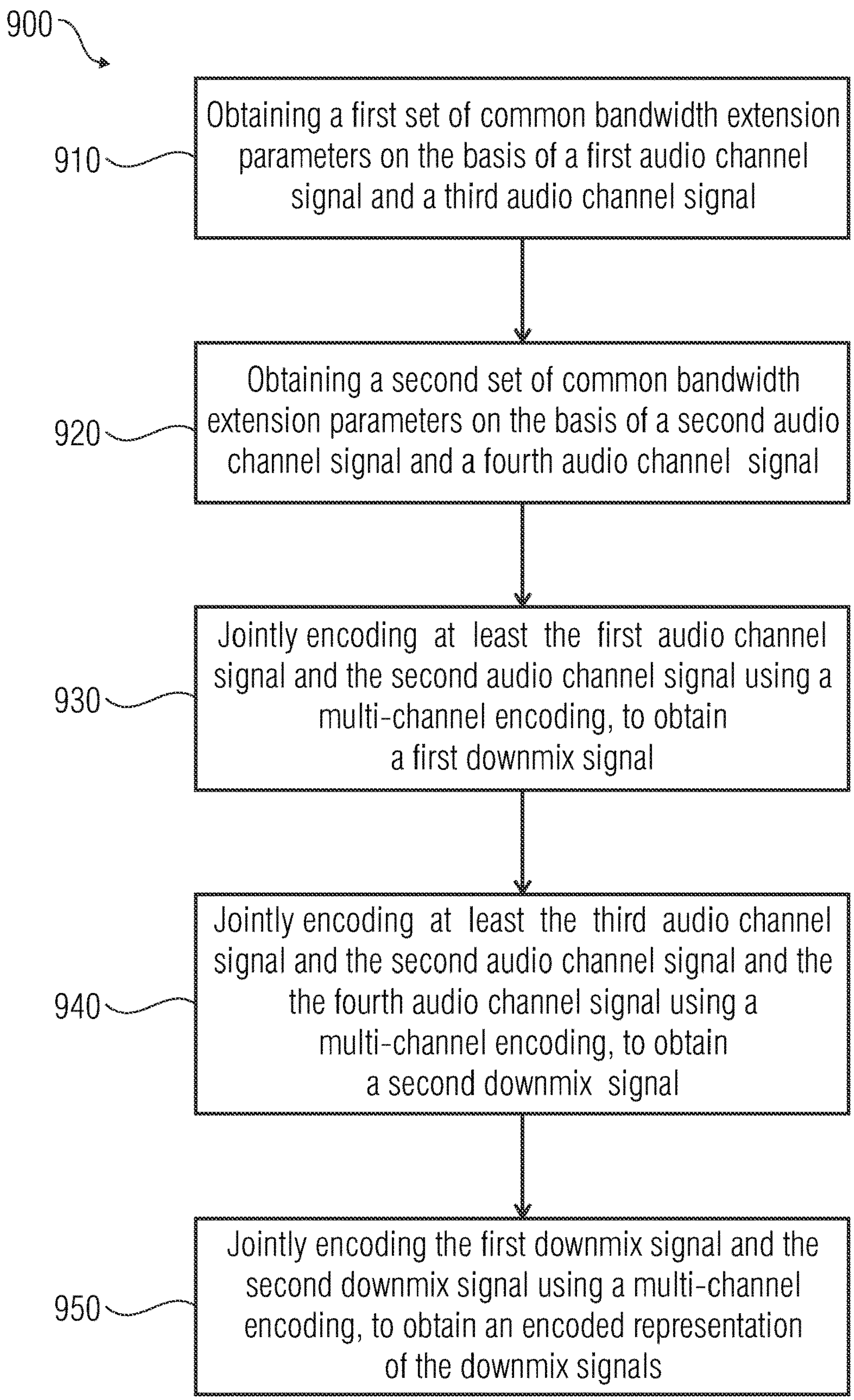
FIG. 9 shows as flowchart of a method for providing an encoded representation on the basis of at least four audio channel signals, according to an embodiment of the invention.

FIG. 9 shows a flow chart of a method 900 for providing an encoded representation on the basis of at least four audio channel signal.

The method 900 comprises obtaining 910 a first set of common bandwidth extension parameters on the basis of a first audio channel signal and a third audio channel signal. The method 900 also comprises obtaining 920 a second set of common bandwidth extension parameters on the basis of a second audio channel signal and a fourth audio channel signal.

The method also comprises jointly encoding at least the first audio channel signal and the second audio channel signal using a multi-channel encoding, to obtain a first downmix signal and jointly encoding 940 at least the third audio channel signal and the fourth audio channel signal using a multi-channel encoding to obtain a second downmix signal. The method also comprises jointly encoding 950 the first downmix signal and the second downmix signal using a multi-channel encoding, to obtain an encoded representation of the downmix signals.

It should be noted that some of the steps of the method 900, which do not comprise specific inter dependencies, can be performed in arbitrary order or in parallel. Moreover, it should be noted that the method 900 can be supplemented by any of the features and functionalities described herein with respect to the audio encoders and audio decoders.

10. Method According to FIG. 10

Figure 10:
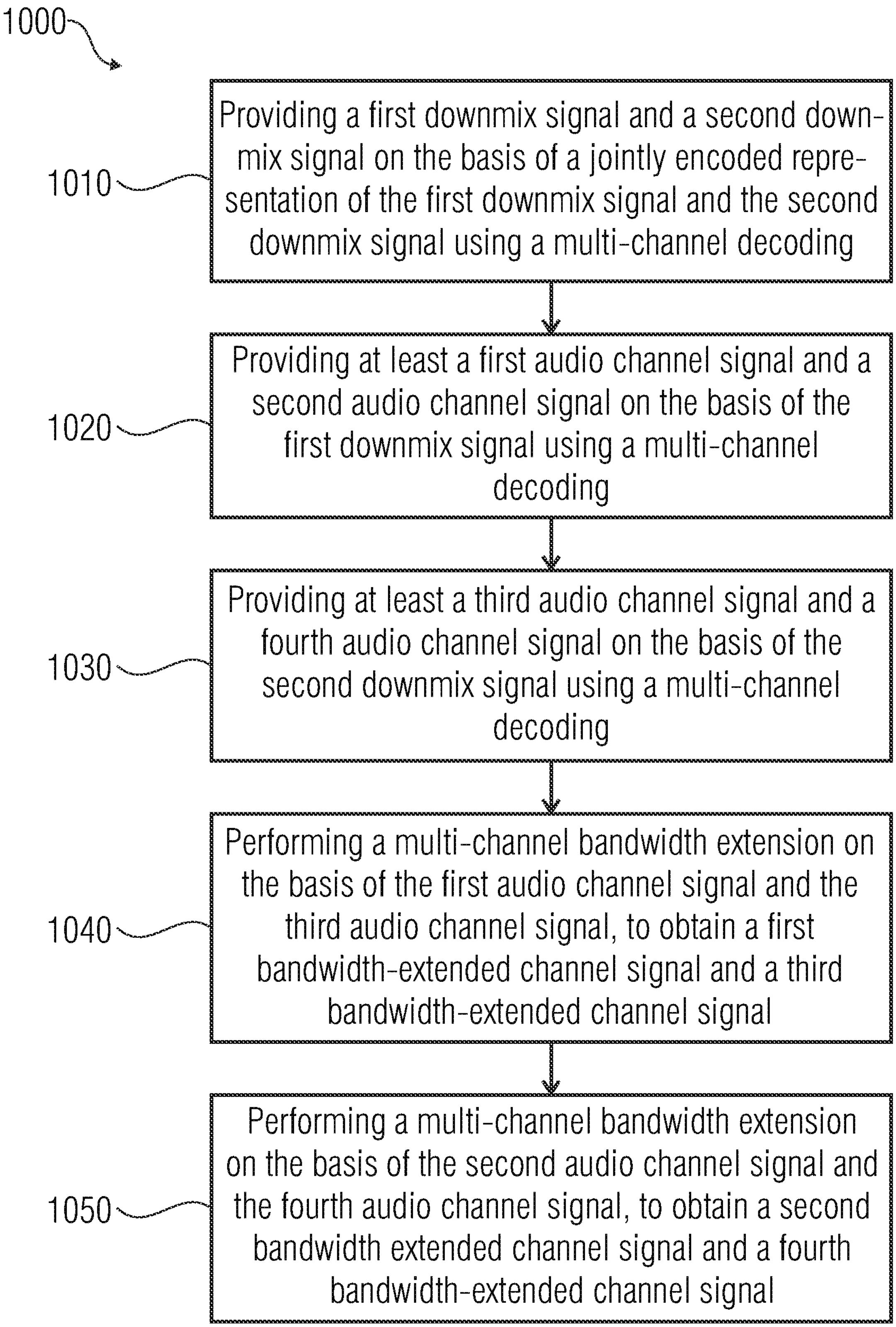
FIG. 10 shows a flowchart of a method for providing at least four audio channel signals on the basis of an encoded representation, according to an embodiment of the invention.

FIG. 10 shows a flow chart of a method 1000 for providing at least four audio channel signals on the basis of an encoded representation.

The method 1000 comprises providing 1010 a first downmix signal and a second downmix signal on the basis of a jointly encoded representation of the first downmix signal and the second downmix signal using a multi-channel decoding, providing 1020 at least a first audio channel signal and a second audio channel signal on the basis of the first downmix signal using a multi-channel decoding, providing 1030 at least a third audio channel signal and a fourth audio channel signal on the basis of the second downmix signal using a multi-channel decoding, performing 1040 a multi-channel bandwidth extension on the basis of the first audio channel signal and the third audio channel signal, to obtain a first bandwidth-extended channel signal and a third bandwidth-extended channel signal, and performing 1050 a multi-channel bandwidth extension on the basis of the second audio channel signal and the fourth audio channel signal, to obtain a second bandwidth-extended channel signal and a fourth bandwidth-extended channel signal.

It should be noted that some of the steps of the method 1000 may be preformed in parallel or in a different order. Moreover, it should be noted that the method 1000 can be supplemented by any of the features and functionalities described herein with respect to the audio encoder and the audio decoder.

11. Embodiments According to FIGS. 11, 12 and 13

In the following, some additional embodiments according to the present invention and the underlying considerations will be described.

Figure 11:
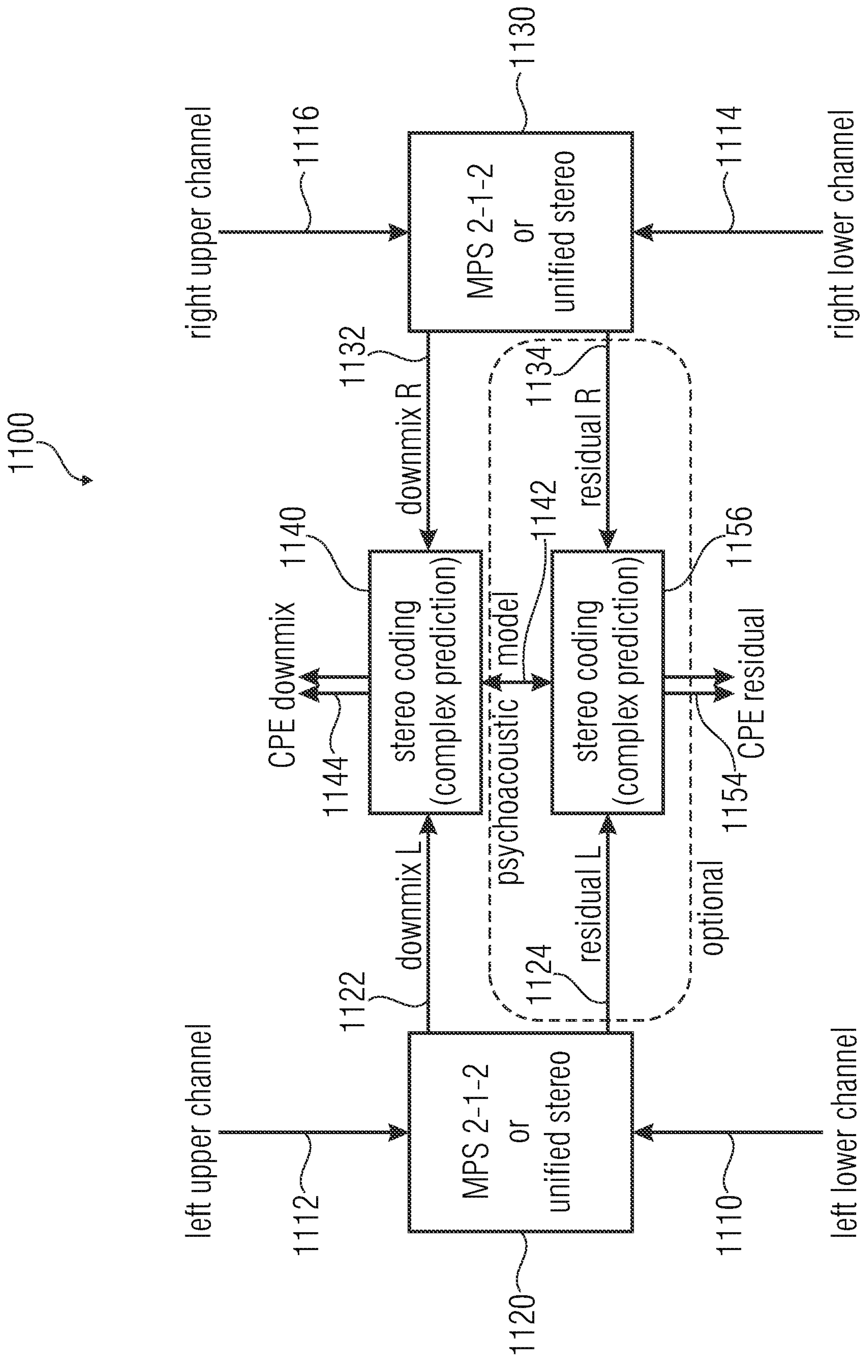
FIG. 11 shows a block schematic diagram of an audio encoder, according to an embodiment of the invention.

FIG. 11 shows a block schematic diagram of an audio encoder 1100 according to an embodiment of the invention. The audio encoder 1100 is configured to receive a left lower channel signal 1110, a left upper channel signal 1112, a right lower channel signal 1114 and a right upper channel signal 1116.

The audio encoder 1100 comprises a first multi-channel audio encoder (or encoding) 1120, which is an MPEG surround2-1-2 audio encoder (or encoding) or a unified stereo audio encoder (or encoding) and which receives the left lower channel signal 1110 and the left upper channel signal 1112. The first multi-channel audio encoder 1120 provides a left downmix signal 1122 and, optionally, a left residual signal 1124. Moreover, the audio encoder 1100 comprises a second multi-channel encoder (or encoding) 1130, which is an MPEG-surround2-1-2 encoder (or encoding) or a unified stereo encoder (or encoding) which receives the right lower channel signal 1114 and the right upper channel signal 1116. The second multi-channel audio encoder 1130 provides a right downmix signal 1132 and, optionally, a right residual signal 1134. The audio encoder 1100 also comprises a stereo coder (or coding) 1140, which receives the left downmix signal 1122 and the right downmix signal 1132. Moreover, the first stereo coding 1140, which is a complex prediction stereo coding, receives a psycho acoustic model information 1142 from a psycho acoustic model. For example, the psycho model information 1142 may describe the psycho acoustic relevance of different frequency bands or frequency subbands, psycho acoustic masking effects and the like. The stereo coding 1140 provides a channel pair element (CPE) "downmix", which is designated with 1144 and which describes the left downmix signal 1122 and the right downmix signal 1132 in a jointly encoded form.

Moreover, the audio encoder 1100 optionally comprises a second stereo coder (or coding) 1150, which is configured to receive the optional left residual signal 1124 and the optional right residual signal 1134, as well as the psycho acoustic model information 1142. The second stereo coding 1150, which is a complex prediction stereo coding, is configured to provide a channel pair element (CPE) "residual", which represents the left residual signal 1124 and the right residual signal 1134 in a jointly encoded form.

The encoder 1100 (as well as the other audio encoders described herein) is based on the idea that horizontal and vertical signal dependencies are exploited by hierarchically combining available USAC stereo tools (i.e., encoding concepts which are available in the USAC encoding). Vertically neighbored channel pairs are combined using MPEG surround2-1-2 or unified stereo (designated with 1120 and 1130) with a band-limited or full-band residual signal (designated with 1124 and 1134). The output of each vertical channel pair is a downmix signal 1122, 1132 and, for the unified stereo, a residual signal 1124, 1134. In order to satisfy perceptual requirements for binaural unmasking, both downmix signals 1122, 1132 are combined horizontally and jointly coded by use of complex prediction (encoder 1140) in the MDCT domain, which includes the possibility of left-right and mid-side coding. The same method can be applied to the horizontally combined residual signals 1124, 1134. This concept is illustrated in FIG. 11.

The hierarchical structure explained with reference to FIG. 11 can be achieved by enabling both stereo tools (for example, both USAC stereo tools) and resorting channels in between. Thus, no additional pre-/post processing step is necessary and the bit stream syntax for transmission of the tool's payloads remains unchanged (for example, substantially unchanged when compared to the USAC standard). This idea results in the encoder structure shown in FIG. 12.

Figure 12:
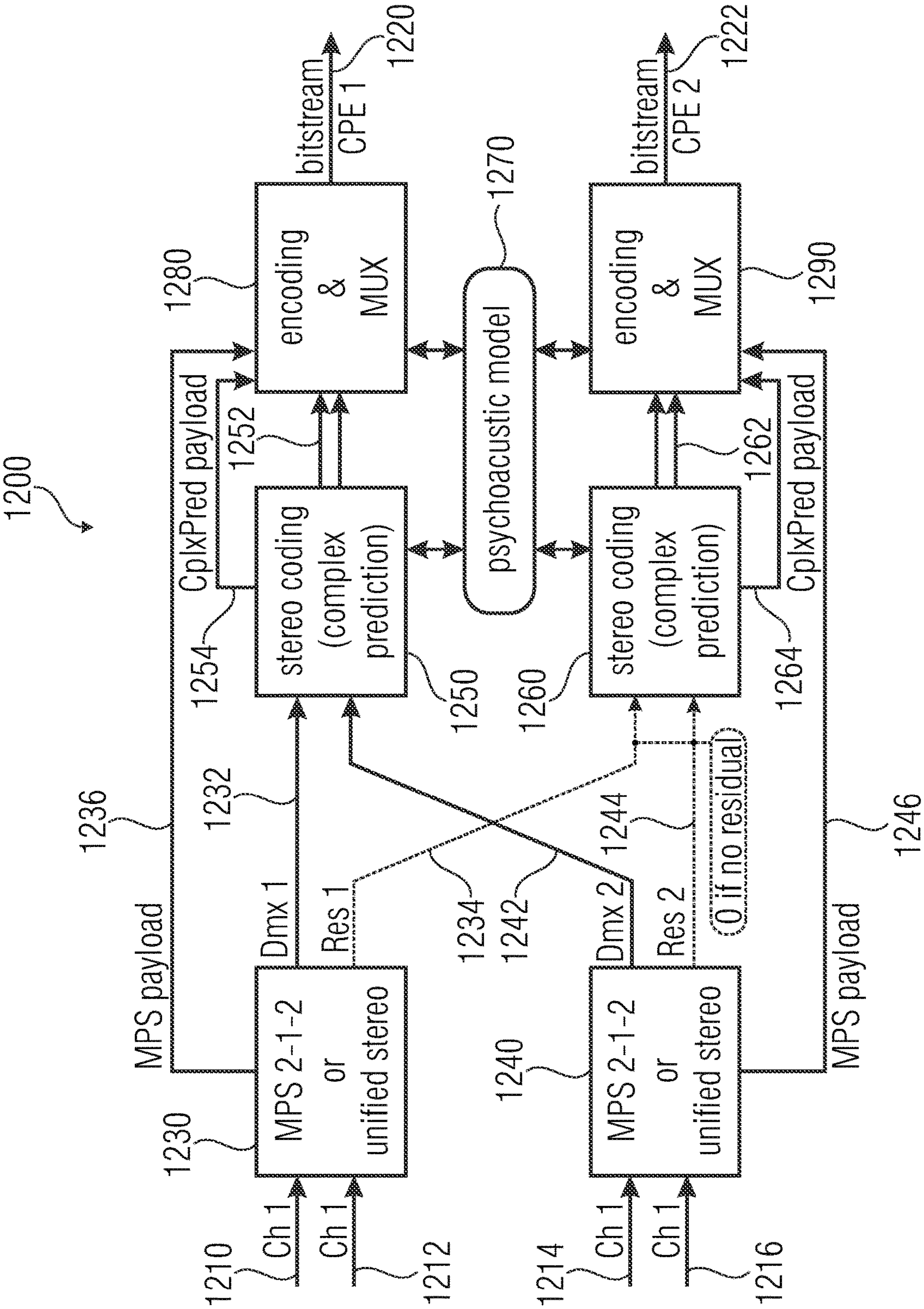
FIG. 12 shows a block schematic diagram of an audio encoder, according to another embodiment of the invention.

FIG. 12 shows a block schematic diagram of an audio encoder 1200, according to an embodiment of the invention. The audio encoder 1200 is configured to receive a first channel signal 1210, a second channel signal 1212, a third channel signal 1214 and a fourth channel signal 1216. The audio encoder 1200 is configured to provide a bit stream 1220 for a first channel pair element and a bit stream 1222 for a second channel pair element.

The audio encoder 1200 comprises a first multi-channel encoder 1230, which is an MPEG-surround 2-1-2 encoder or a unified stereo encoder, and which receives the first channel signal 1210 and the second channel signal 1212. Moreover, the first multi-channel encoder 1230 provides a first downmix signal 1232, an MPEG surround payload 1236 and, optionally, a first residual signal 1234. The audio encoder 1200 also comprises a second multi-channel encoder 1240 which is an MPEG surround2-1-2 encoder or a unified stereo encoder and which receives the third channel signal 1214 and the fourth channel signal 1216. The second multi-channel encoder 1240 provides a first downmix signal 1242, an MPEG surround payload 1246 and, optionally, a second residual signal 1244.

The audio encoder 1200 also comprises first stereo coding 1250, which is a complex prediction stereo coding. The first stereo coding 1250 receives the first downmix signal 1232 and the second downmix signal 1242. The first stereo coding 1250 provides a jointly encoded representation 1252 of the first downmix signal 1232 and the second downmix signal 1242, wherein the jointly encoded representation 1252 may comprise a representation of a (common) downmix signal (of the first downmix signal 1232 and of the second downmix signal 1242) and of a common residual signal (of the first downmix signal 1232 and of the second downmix signal 1242). Moreover, the (first) complex prediction stereo coding 1250 provides a complex prediction payload 1254, which typically comprises one or more complex prediction coefficients. Moreover, the audio encoder 1200 also comprises a second stereo coding 1260, which is a complex prediction stereo coding. The second stereo coding 1260 receives the first residual signal 1234 and the second residual signal 1244 (or zero input values, if there is no residual signal provided by the multi-channel encoders 1230, 1240). The second stereo coding 1260 provides a jointly encoded representation 1262 of the first residual signal 1234 and of the second residual signal 1244, which may, for example, comprise a (common) downmix signal (of the first residual signal 1234 and of the second residual signal 1244) and a common residual signal (of the first residual signal 1234 and of the second residual signal 1244). Moreover, the complex prediction stereo coding 1260 provides a complex prediction payload 1264 which typically comprises one or more prediction coefficients.

Moreover, the audio encoder 1200 comprises a psycho acoustic model 1270, which provides an information that controls the first complex prediction stereo coding 1250 and the second complex prediction stereo coding 1260. For example, the information provided by the psycho acoustic model 1270 may describe which frequency bands or frequency bins are of high psycho acoustic relevance and should be encoded with high accuracy. However, it should be noted that the usage of the information provided by the psycho acoustic model 1270 is optional.

Moreover, the audio encoder 1200 comprises a first encoder and multiplexer 1280 which receives the jointly encoded representation 1252 from the first complex prediction stereo coding 1250, the complex prediction payload 1254 from the first complex prediction stereo coding 1250 and the MPEG surround payload 1236 from the first multichannel audio encoder 1230. Moreover, the first encoding and multiplexing 1280 may receive information from the psycho acoustic model 1270, which describes, for example, which encoding precision should be applied to which frequency bands or frequency subbands, taking into account psycho acoustic masking effects and the like. Accordingly, the first encoding and multiplexing 1280 provides the first channel pair element bit stream 1220.

Moreover, the audio encoder 1200 comprises a second encoding and multiplexing 1290, which is configured to receive the jointly encoded representation 1262 provided by the second complex prediction stereo encoding 1260, the complex prediction payload 1264 proved by the second complex prediction stereo coding 1260, and the MPEG surround payload 1246 provided by the second multi-channel audio encoder 1240. Moreover, the second encoding and multiplexing 1290 may receive an information from the psycho acoustic model 1270. Accordingly, the second encoding and multiplexing 1290 provides the second channel pair element bit stream 1222.

Regarding the functionality of the audio encoder 1200, reference is made to the above explanations, and also to the explanations with respect to the audio encoders according to FIGS. 2, 3, 5 and 6.

Moreover, it should be noted that this concept can be extended to use multiple MPEG surround boxes for joint coding of horizontally, vertically or otherwise geometrically related channels and combining the downmix and residual signals to complex prediction stereo pairs, considering their geometric and perceptual properties. This leads to a generalized decoder structure.

In the following, the implementation of a quad channel element will be described. In a three-dimensional audio coding system, the hierarchical combination of four channels to form a quad channel element (QCE) is used. A QCE consists of two USAC channel pair elements (CPE) (or provides two USAC channel pair elements, or receives to USAC channel pair elements). Vertical channel pairs are combined using MPS2-1-2 or unified stereo. The downmix channels are jointly coded in the first channel pair element CPE. If residual coding is applied, the residual signals are jointly coded in the second channel pair element CPE, else the signal in the second CPE is set to zero. Both channel pair elements CPEs use complex prediction for joint stereo coding, including the possibility of left-right and mid-side coding. To preserve the perceptual stereo properties of the high frequency part of the signal, stereo SBR (spectral bandwidth replication) is applied between the upper left/right channel pair and the lower left/right channel pair, by an additional resorting step before the application of SBR.

A possible decoder structure will be described taking reference to FIG. 13 which shows a block schematic diagram of an audio decoder according to an embodiment of the invention. The audio decoder 1300 is configured to receive a first bit stream 1310 representing a first channel pair element and a second bit stream 1312 representing a second channel pair element. However, the first bit stream 1310 and the second bit stream 1312 may be included in a common overall bit stream.

The audio decoder 1300 is configured to provide a first bandwidth extended channel signal 1320, which may, for example, represent a lower left position of an audio scene, a second bandwidth extended channel signal 1322, which may, for example, represent an upper left position of the audio scene, a third bandwidth extended channel signal 1324, which may, for example, be associated with a lower right position of the audio scene and a fourth bandwidth extended channel signal 1326, which may, for example, be associated with an upper right position of the audio scene.

The audio decoder 1300 comprises a first bit stream decoding 1330, which is configured to receive the bit stream 1310 for the first channel pair element and to provide, on the basis thereof, a jointly-encoded representation of two downmix signals, a complex prediction payload 1334, an MPEG surround payload 1336 and a spectral bandwidth replication payload 1338. The audio decoder 1300 also comprises a first complex prediction stereo decoding 1340, which is configured to receive the jointly encoded representation 1332 and the complex prediction payload 1334 and to provide, on the basis thereof, a first downmix signal 1342 and a second downmix signal 1344. Similarly, the audio decoder 1300 comprises a second bit stream decoding 1350 which is configured to receive the bit stream 1312 for the second channel element and to provide, on the basis thereof, a jointly encoded representation 1352 of two residual signals, a complex prediction payload 1354, an MPEG surround payload 1356 and a spectral bandwidth replication bit load 1358. The audio decoder also comprises a second complex prediction stereo decoding 1360, which provides a first residual signal 1362 and a second residual signal 1364 on the basis of the jointly encoded representation 1352 and the complex prediction payload 1354.

Moreover, the audio decoder 1300 comprises a first MPEG surround-type multichannel decoding 1370, which is an MPEG surround2-1-2 decoding or a unified stereo decoding. The first MPEG surround-type multi-channel decoding 1370 receives the first downmix signal 1342, the first residual signal 1362 (optional) and the MPEG surround payload 1336 and provides, on the basis thereof, a first audio channel signal 1372 and a second audio channel signal 1374. The audio decoder 1300 also comprises a second MPEG surround-type multi-channel decoding 1380, which is an MPEG surround2-1-2 multi-channel decoding or a unified stereo multi-channel decoding. The second MPEG surround-type multi-channel decoding 1380 receives the second downmix signal 1344 and the second residual signal 1364 (optional), as well as the MPEG surround payload 1356, and provides, on the basis thereof, a third audio channel signal 1382 and fourth audio channel signal 1384. The audio decoder 1300 also comprises a first stereo spectral bandwidth replication 1390, which is configured to receive the first audio channel signal 1372 and the third audio channel signal 1382, as well as the spectral bandwidth replication payload 1338, and to provide, on the basis thereof, the first bandwidth extended channel signal 1320 and the third bandwidth extended channel signal 1324. Moreover, the audio decoder comprises a second stereo spectral bandwidth replication 1394, which is configured to receive the second audio channel signal 1374 and the fourth audio channel signal 1384, as well as the spectral bandwidth replication payload 1358 and to provide, on the basis thereof, the second bandwidth extended channel signal 1322 and the fourth bandwidth extended channel signal 1326.

Regarding the functionality of the audio decoder 1300, reference is made to the above discussion, and also the discussion of the audio decoder according to FIGS. 2, 3, 5 and 6.

In the following, an example of a bit stream which can be used for the audio encoding/decoding described herein will be described taking reference to FIGS. 14*a* and 14*b*. It should be noted that the bit stream may, for example, be an extension of the bit stream used in the unified speech-and-audio coding (USAC), which is described in the above mentioned standard (ISO/IEC 23003-3:2012). For example, the MPEG surround payloads 1236, 1246, 1336, 1356 and the complex prediction payloads 1254, 1264, 1334, 1354 may be transmitted as for legacy channel pair elements (i.e., for channel pair elements according to the USAC standard). For signaling the use of a quad channel element QCE, the USAC channel pair configuration may be extended by two bits, as shown in FIG. 14*a*. In other words, two bits designated with "qceIndex" may be added to the USAC bitstream element "UsacChannelPairElementConfig( )". The meaning of the parameter represented by the bits "qceIndex" can be defined, for example, as shown in the table of FIG. 14*b*.

For example, two channel pair elements that form a QCE may be transmitted as consecutive elements, first the CPE containing the downmix channels and the MPS payload for the first MPS box, second the CPE containing the residual signal (or zero audio signal for MPS2-1-2 coding) and the MPS payload for the second MPS box.

In other words, there is only a small signaling overhead when compared to the conventional USAC bit stream for transmitting a quad channel element QCE.

However, different bit stream formats can naturally also be used.

12. Encoding/Decoding Environment

In the following, an audio encoding/decoding environment will be described in which concepts according to the present invention can be applied.

A 3D audio codec system, in which the concepts according to the present invention can be used, is based on an MPEG-D USAC codec for decoding of channel and object signals. To increase the efficiency for coding a large amount of objects, MPEG SAOC technology has been adapted. Three types of renderers perform the tasks of rendering objects to channels, rendering channels to headphones or rendering channels to a different loudspeaker setup. When object signals are explicitly transmitted or parametrically encoded using SAOC, the corresponding object metadata information is compressed and multiplexed into the 3D audio bit stream.

Figure 15:
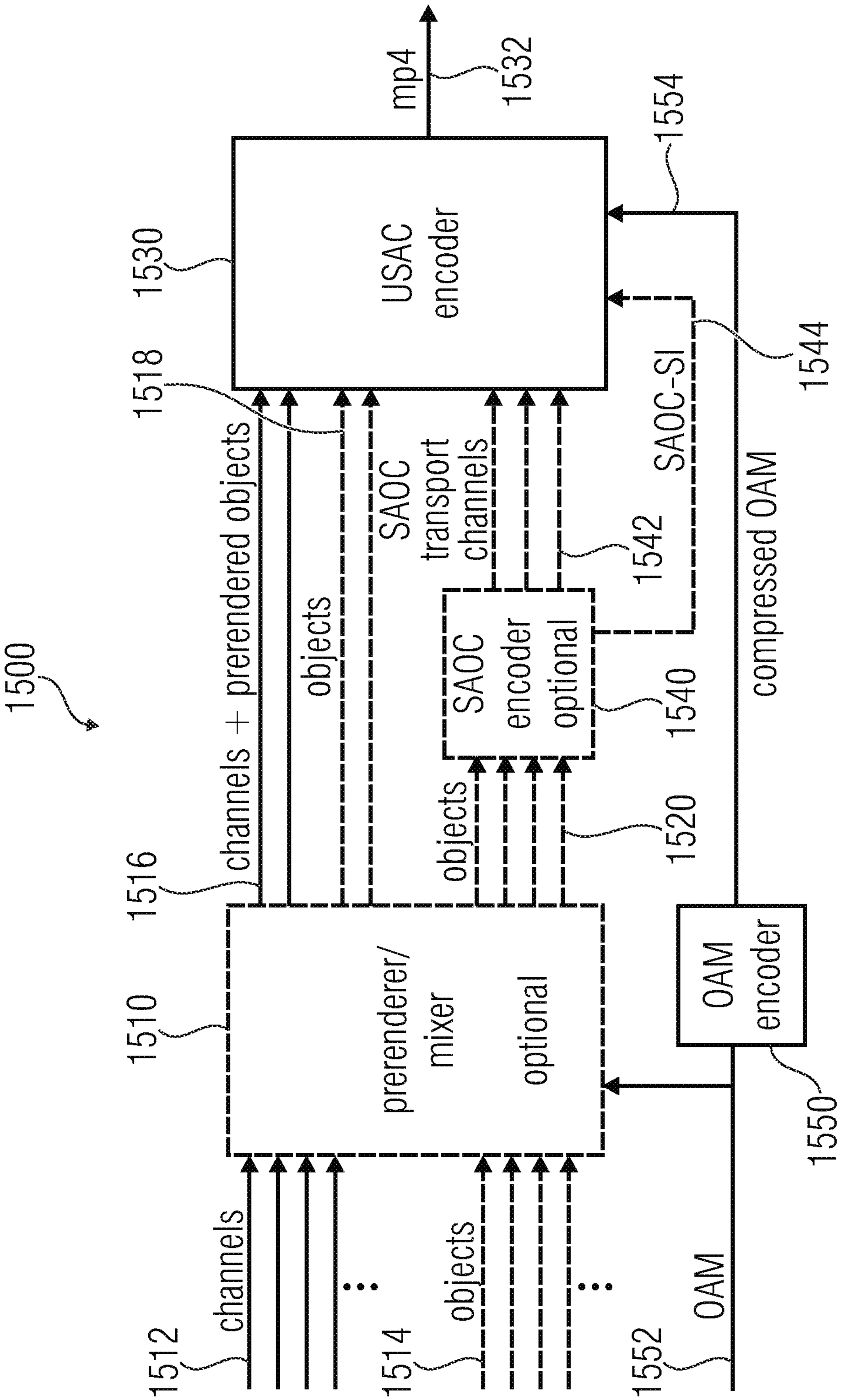
FIG. 15 shows a block schematic diagram of a 3D audio encoder in which the concepts according to the present invention can be used.
Figure 16:
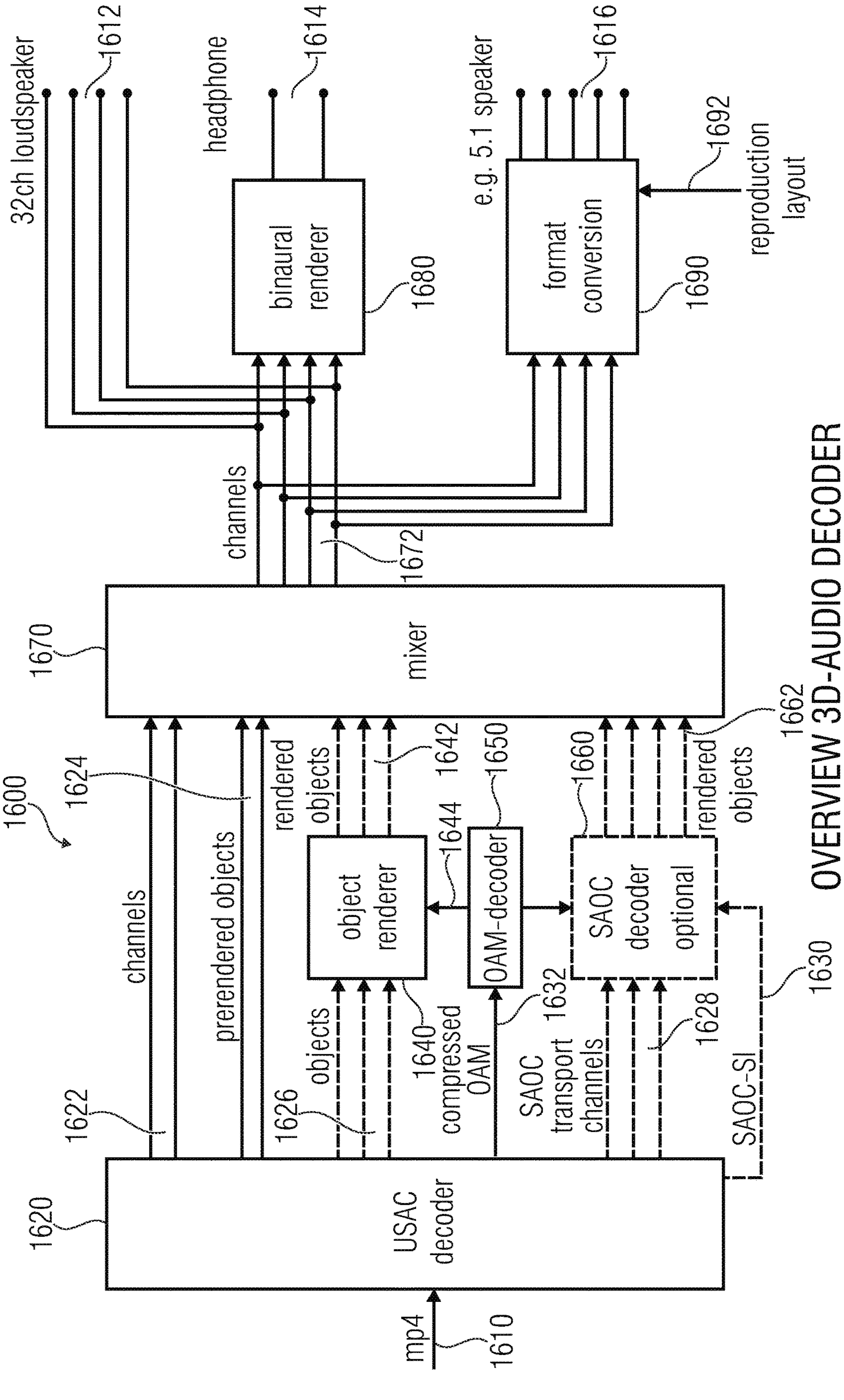
FIG. 16 shows a block schematic diagram of a 3D audio decoder in which the concepts according to the present invention can be used.

FIG. 15 shows a block schematic diagram of such an audio encoder, and FIG. 16 shows a block schematic diagram of such an audio decoder. In other words, FIGS. 15 and 16 show the different algorithmic blocks of the 3D audio system.

Taking reference now to FIG. 15, which shows a block schematic diagram of a 3D audio encoder 1500, some details will be explained. The encoder 1500 comprises an optional pre-renderer/mixer 1510, which receives one or more channel signals 1512 and one or more object signals 1514 and provides, on the basis thereof, one or more channel signals 1516 as well as one or more object signals 1518, 1520. The audio encoder also comprises a USAC encoder 1530 and, optionally, a SAOC encoder 1540. The SAOC encoder 1540 is configured to provide one or more SAOC transport channels 1542 and a SAOC side information 1544 on the basis of one or more objects 1520 provided to the SAOC encoder. Moreover, the USAC encoder 1530 is configured to receive the channel signals 1516 comprising channels and pre-rendered objects from the pre-renderer/mixer, to receive one or more object signals 1518 from the pre-renderer/mixer and to receive one or more SAOC transport channels 1542 and SAOC side information 1544, and provides, on the basis thereof, an encoded representation 1532. Moreover, the audio encoder 1500 also comprises an object metadata encoder 1550 which is configured to receive object metadata 1552 (which may be evaluated by the pre-renderer/mixer 1510) and to encode the object metadata to obtain encoded object metadata 1554. The encoded metadata is also received by the USAC encoder 1530 and used to provide the encoded representation 1532.

Some details regarding the individual components of the audio encoder 1500 will be described below.

Taking reference now to FIG. 16, an audio decoder 1600 will be described. The audio decoder 1600 is configured to receive an encoded representation 1610 and to provide, on the basis thereof, multi-channel loudspeaker signals 1612, headphone signals 1614 and/or loudspeaker signals 1616 in an alternative format (for example, in a 5.1 format).

The audio decoder 1600 comprises a USAC decoder 1620, and provides one or more channel signals 1622, one or more pre-rendered object signals 1624, one or more object signals 1626, one or more SAOC transport channels 1628, a SAOC side information 1630 and a compressed object metadata information 1632 on the basis of the encoded representation 1610. The audio decoder 1600 also comprises an object renderer 1640 which is configured to provide one or more rendered object signals 1642 on the basis of the object signal 1626 and an object metadata information 1644, wherein the object metadata information 1644 is provided by an object metadata decoder 1650 on the basis of the compressed object metadata information 1632. The audio decoder 1600 also comprises, optionally, a SAOC decoder 1660, which is configured to receive the SAOC transport channel 1628 and the SAOC side information 1630, and to provide, on the basis thereof, one or more rendered object signals 1662. The audio decoder 1600 also comprises a mixer 1670, which is configured to receive the channel signals 1622, the pre-rendered object signals 1624, the rendered object signals 1642, and the rendered object signals 1662, and to provide, on the basis thereof, a plurality of mixed channel signals 1672 which may, for example, constitute the multi-channel loudspeaker signals 1612. The audio decoder 1600 may, for example, also comprise a binaural render 1680, which is configured to receive the mixed channel signals 1672 and to provide, on the basis thereof, the headphone signals 1614. Moreover, the audio decoder 1600 may comprise a format conversion 1690, which is configured to receive the mixed channel signals 1672 and a reproduction layout information 1692 and to provide, on the basis thereof, a loudspeaker signal 1616 for an alternative loudspeaker setup.

In the following, some details regarding the components of the audio encoder 1500 and of the audio decoder 1600 will be described.

Pre-Renderer/Mixer

The pre-renderer/mixer 1510 can be optionally used to convert a channel plus object input scene into a channel scene before encoding. Functionally, it may, for example, be identical to the object renderer/mixer described below. Pre-rendering of objects may, for example, ensure a deterministic signal entropy at the encoder input that is basically independent of the number of simultaneously active object signals. In the pre-rendering of objects, no object metadata transmission is required. Discreet object signals are rendered to the channel layout that the encoder is configured to use. The weights of the objects for each channel are obtained from the associated object metadata (OAM) 1552.

USAC Core Codec

The core codec 1530, 1620 for loudspeaker-channel signals, discreet object signals, object downmix signals and pre-rendered signals is based on MPEG-D USAC technology. It handles the coding of the multitude of signals by creating channel and object mapping information based on the geometric and semantic information of the input's channel and object assignment. This mapping information describes how input channels and objects are mapped to USAC-channel elements (CPEs, SCEs, LFEs) and the corresponding information is transmitted to the decoder. All additional payloads like SAOC data or object metadata have been passed through extension elements and have been considered in the encoders rate control.

The coding of objects is possible in different ways, depending on the rate/distortion requirements and the interactivity requirements for the renderer. The following object coding variants are possible:

1. Pre-rendered objects: object signals are pre-rendered and mixed to the 22.2 channel signals before encoding. The subsequent coding chain sees 22.2 channel signals.
2. Discreet object wave forms: objects are supplied as monophonic wave forms to the encoder. The encoder uses single channel elements SCEs to transfer the objects in addition to the channel signals. The decoded objects are rendered and mixed at the receiver side. Compressed object metadata information is transmitted to the receiver/renderer along side.
3. Parametric object wave forms: object properties and there relation to each other are described by means of SAOC parameters. The downmix of the object signals is coded with USAC. The parametric information is transmitted along side. The number of downmix channels is chosen depending on the number of objects and the overall data rate. Compressed object metadata information is transmitted to the SAOC renderer.

SAOC

The SAOC encoder 1540 and the SAOC decoder 1660 for object signals are based on MPEG SAOC technology. The system is capable of recreating, modifying and rendering a number of audio objects based on a smaller number of transmitted channels and additional parametric data (object level differences OLDs, inter object correlations IOCs, downmix gains DMGs). The additional parametric data exhibits a significantly lower data rate than may be used for transmitting all objects individually, making the coding very efficient. The SAOC encoder takes as input the object/channel signals as monophonic waveforms and outputs the parametric information (which is packed into the 3D-audio bit stream 1532, 1610) and the SAOC transport channels (which are encoded using single channel elements and transmitted).

The SAOC decoder 1600 reconstructs the object/channel signals from the decoded SAOC transport channels 1628 and parametric information 1630, and generates the output audio scene based on the reproduction layout, the decompressed object metadata information and optionally on the user interaction information.

Object Metadata Codec

For each object, the associated metadata that specifies the geometrical position and volume of the object in 3D space is efficiently coded by quantization of the object properties in time and space. The compressed object metadata cOAM 1554, 1632 is transmitted to the receiver as side information.

Object Renderer/Mixer

The object renderer utilizes the compressed object metadata to generate object waveforms according to the given reproduction format. Each object is rendered to certain output channels according to its metadata. The output of this block results from the sum of the partial results. If both channel based content as well as discreet/parametric objects are decoded, the channel based waveforms and the rendered object waveforms are mixed before outputting the resulting waveforms (or before feeding them to a post processor module like the binaural renderer or the loudspeaker renderer module).

Binaural Renderer

The binaural renderer module 1680 produces a binaural downmix of the multichannel audio material, such that each input channel is represented by a virtual sound source. The processing is conducted frame-wise in QMF domain. The binauralization is based on measured binaural room impulse responses.

Loudspeaker Renderer/Format Conversion

The loudspeaker renderer 1690 converts between the transmitted channel configuration and the desired reproduction format. It is thus called "format converter" in the following. The format converter performs conversions to lower numbers of output channels, i.e., it creates downmixes. The system automatically generates optimized downmix matrices for the given combination of input and output formats and applies these matrices in a dowmix process. The format converter allows for standard loudspeaker configurations as well as for random configurations with non-standard loudspeaker positions.

Figure 17:
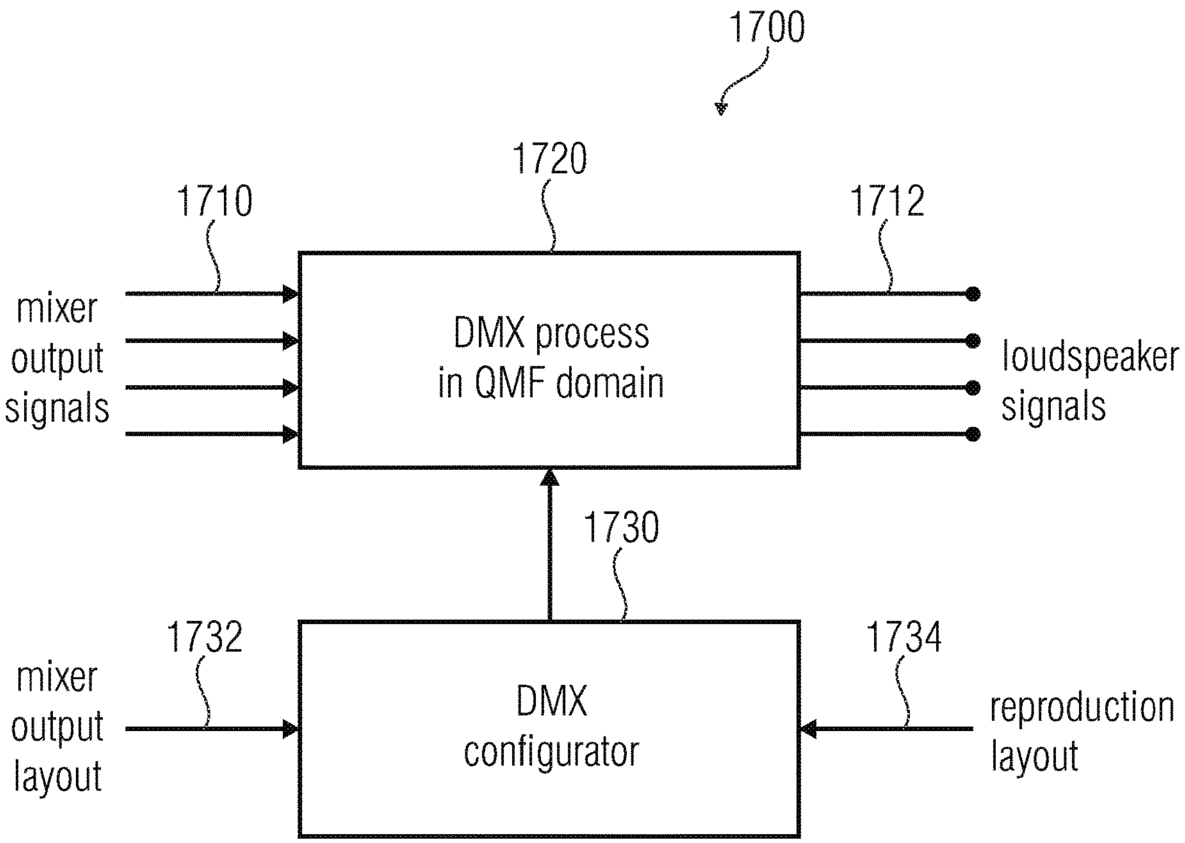
FIG. 17 shows a block schematic diagram of a format converter.

FIG. 17 shows a block schematic diagram of the format converter. As can be seen, the format converter 1700 receives mixer output signals 1710, for example, the mixed channel signals 1672 and provides loudspeaker signals 1712, for example, the speaker signals 1616. The format converter comprises a downmix process 1720 in the QMF domain and a downmix configurator 1730, wherein the downmix configurator provides configuration information for the downmix process 1720 on the basis of a mixer output layout information 1732 and a reproduction layout information 1734.

Moreover, it should be noted that the concepts described above, for example the audio encoder 100, the audio decoder 200 or 300, the audio encoder 400, the audio decoder 500 or 600, the methods 700, 800, 900, or 1000, the audio encoder 1100 or 1200 and the audio decoder 1300 can be used within the audio encoder 1500 and/or within the audio decoder 1600. For example, the audio encoders/decoders mentioned before can be used for encoding or decoding of channel signals which are associated with different spatial positions.

13. Alternative Embodiments

In the following, some additional embodiments will be described.

Taking reference now to FIGS. 18 to 21, additional embodiments according o the invention will be explained.

It should be noted that a so-called "Quad Channel Element" (QCE) can be considered as a tool of an audio decoder, which can be used, for example, for decoding 3-dimensional audio content.

In other words, the Quad Channel Element (QCE) is a method for joint coding of four channels for more efficient coding of horizontally and vertically distributed channels. A QCE consists of two consecutive CPEs and is formed by hierarchically combining the Joint Stereo Tool with possibility of Complex Stereo Prediction Tool in horizontal direction and the MPEG Surround based stereo tool in vertical direction. This is achieved by enabling both stereo tools and swapping output channels between applying the tools. Stereo SBR is performed in horizontal direction to preserve the left-right relations of high frequencies.

Figure 18:
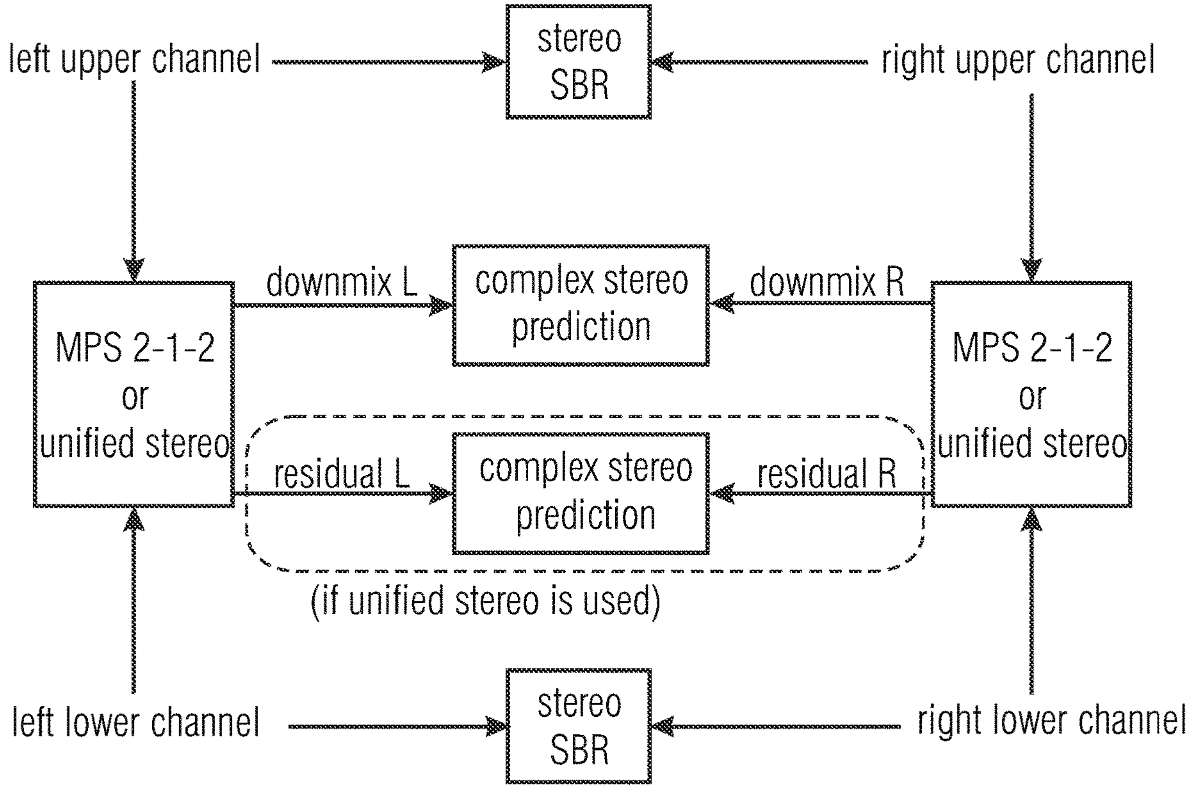
FIG. 18 shows a graphical representation of a topological structure of a Quad Channel Element (QCE), according to an embodiment of the present invention.

FIG. 18 shows a topological structure of a QCE. It should be noted that the QCE of FIG. 18 is very similar to the QCE of FIG. 11, such that reference is made to the above explanations. However, it should be noted that, in the QCE of FIG. 18, it is not necessary to make use of the psychoacoustic model when performing complex stereo prediction (while, such use is naturally possible optionally). Moreover, it can be seen that first stereo spectral bandwidth replication (Stereo SBR) is performed on the basis of the left lower channel and the right lower channel, and that that second stereo spectral bandwidth replication (Stereo SBR) is performed on the basis of the left upper channel and the right upper channel.

In the following, some terms and definitions will be provided, which may apply in some embodiments.

A data element qceIndex indicates a QCE mode of a CPE. Regarding the meaning of the bitstream variable qceIndex, reference is made to FIG. 14*b*. It should be noted that qceIndex describes whether two subsequent elements of type UsacChannelPairElement( ) are treated as a Quadruple Channel Element (QCE). The different QCE modes are given in FIG. 14*b*. The qceIndex shall be the same for the two subsequent elements forming one QCE.

In the following, some help elements will be defined, which may be used in some embodiments according to the invention:

cplx_out_dmx_L[ ] first channel of first CPE after complex prediction stereo decoding cplx_out_dmx_R[ ] second channel of first CPE after complex prediction stereo decoding cplx_out_res_L[ ] second CPE after complex prediction stereo decoding (zero if qceIndex =1)

cplx_out_res_R[ ] second channel of second CPE after complex prediction stereo decoding (zero if qceIndex =1)

mps_out_L_1[ ] first output channel of first MPS box mps_out_L_2[ ] second output channel of first MPS box mps_out_R_1[ ] first output channel of second MPS box mps_out_R_2[ ] second output channel of second MPS box sbr_out_L_1[ ] first output channel of first Stereo SBR box sbr_out_R_1[ ] second output channel of first Stereo SBR box sbr_out_L_2[ ] first output channel of second Stereo SBR box sbr_out_R_2[ ] second output channel of second Stereo SBR box In the following, a decoding process, which is performed in an embodiment according to the invention, will be explained.

The syntax element (or bitstream element, or data element) qceIndex in UsacChannelPairElementConfig( ) indicates whether a CPE belongs to a QCE and if residual coding is used. In case that qceIndex is unequal 0, the current CPE forms a QCE together with its subsequent element which shall be a CPE having the same qceIndex. Stereo SBR is used for the QCE, thus the syntax item stereoConfigIndex shall be 3 and bsStereoSbr shall be 1.

In case of qceIndex ==1 only the payloads for MPEG Surround and SBR and no relevant audio signal data is contained in the second CPE and the syntax element bsResidualCoding is set to 0.

The presence of a residual signal in the second CPE is indicated by qceIndex ==2. In this case the syntax element bsResidualCoding is set to 1.

However, some different and possible simplified signaling schemes may also be used.

Decoding of Joint Stereo with possibility of Complex Stereo Prediction is performed as described in ISO/IEC 23003-3, subclause 7.7. The resulting output of the first CPE are the MPS downmix signals cplx_out_dmx_L[ ] and cplx_out_dmx_R[ ]. If residual coding is used (i.e. qceIndex ==2), the output of the second CPE are the MPS residual signals cplx_out_res_L[ ], cplx_out_res_R[ ], if no residual signal has been transmitted (i.e. qceIndex ==1), zero signals are inserted.

Before applying MPEG Surround decoding, the second channel of the first element (cplx_out_dmx_R[ ]) and the first channel of the second element (cplx_out_res_L[ ]) are swapped.

Figure 19:
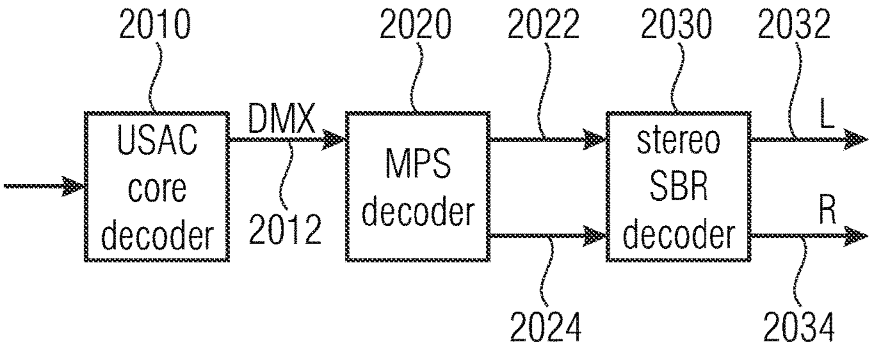
FIG. 19 shows a block schematic diagram of an audio decoder, according to an embodiment of the present invention.

Decoding of MPEG Surround is performed as described in ISO/IEC 23003-3, subclause 7.11. If residual coding is used, the decoding may, however, be modified when compared to conventional MPEG surround decoding in some embodiments. Decoding of MPEG Surround without residual using SBR as defined in ISO/IEC 23003-3, subclause 7.11.2.7 (FIG. 23), is modified so that Stereo SBR is also used for bsResidualCoding ==1, resulting in the decoder schematics shown in FIG. 19. FIG. 19 shows a block schematic diagram of an audio coder for bsResidualCoding ==0 and bsStereoSbr ==1.

As can be seen in FIG. 19, an USAC core decoder 2010 provides a downmix signal (DMX) 2012 to an MPS (MPEG Surround) decoder 2020, which provides a first decoded audio signal 2022 and a second decoded audio signal 2024. A Stereo SBR decoder 2030 receives the first decoded audio signal 2022 and the second decoded audio signal 2024 and provides, on the basis thereof a left bandwidth extended audio signal 2032 and a right bandwidth extended audio signal 2034.

Before applying Stereo SBR, the second channel of the first element (mps_out_L_2[ ]) and the first channel of the second element (mps_out_R_1[ ]) are swapped to allow right-left Stereo SBR. After application of Stereo SBR, the second output channel of the first element (sbr_out_R_1[ ]) and the first channel of the second element (sbr_out_L_2[ ]) are swapped again to restore the input channel order.

Figure 20:
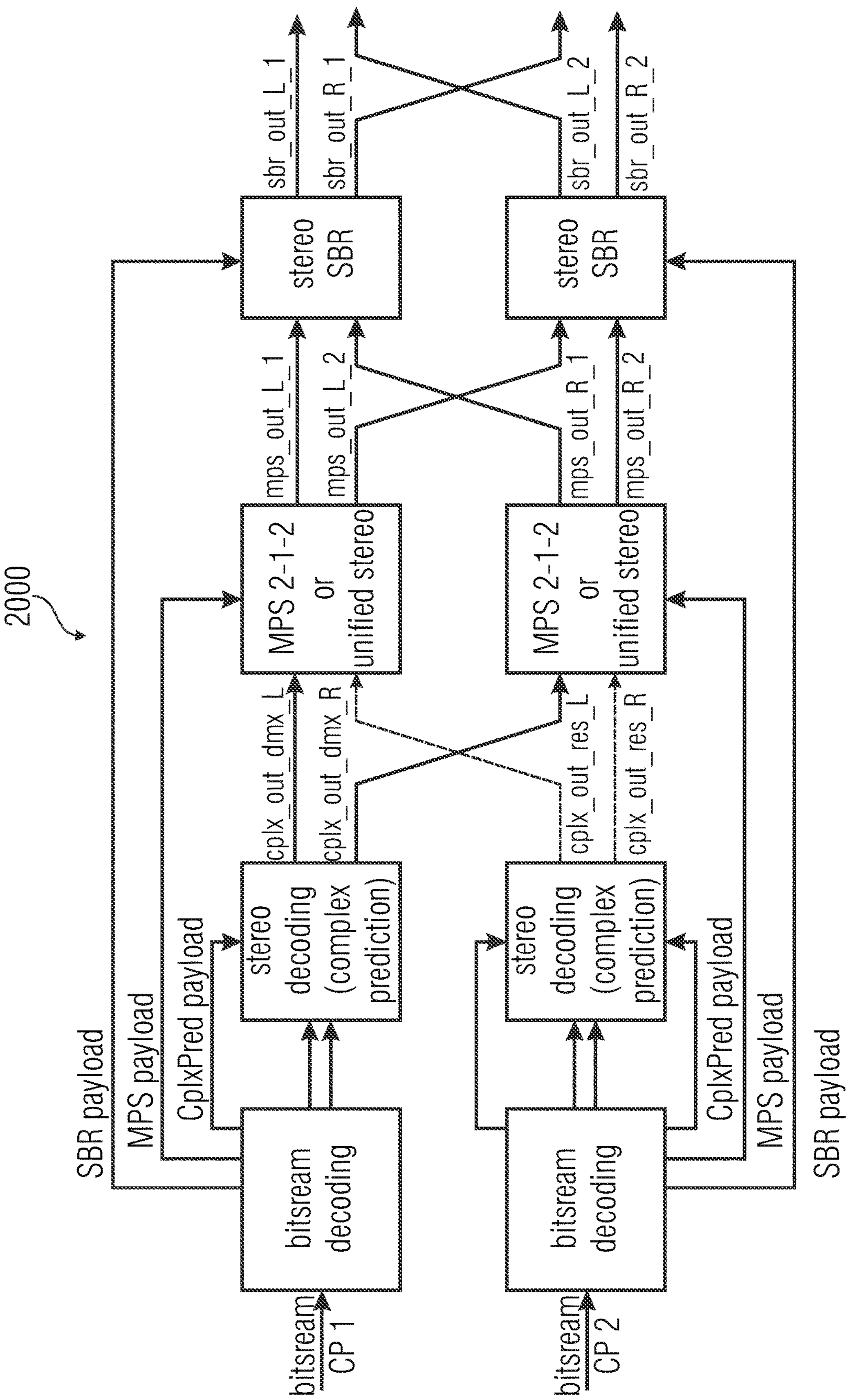
FIG. 20 shows a detailed block schematic diagram of a QCE Decoder, according to an embodiment of the present invention.

A QCE decoder structure is illustrated in FIG. 20, which shows a QCE decoder schematics.

Figure 13:
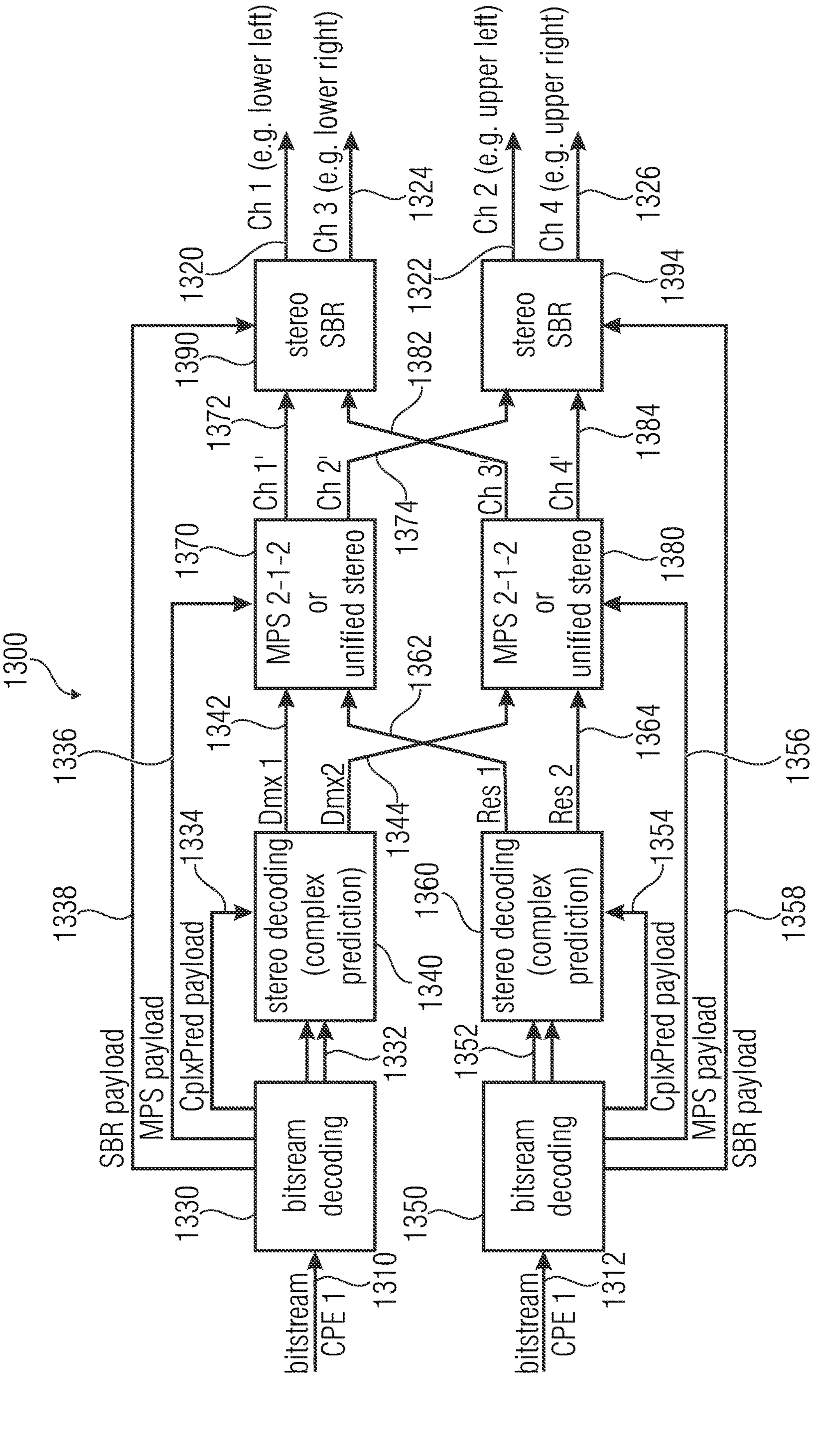
FIG. 13 shows a block schematic diagram of an audio decoder, according to an embodiment of the invention.

It should be noted that the block schematic diagram of FIG. 20 is very similar to the block schematic diagram of FIG. 13, such that reference is also made to the above explanations. Moreover, it should be noted that some signal labeling has been added in FIG. 20, wherein reference is made to the definitions in this section. Moreover, a final resorting of the channels is shown, which is performed after the Stereo SBR.

Figure 21:
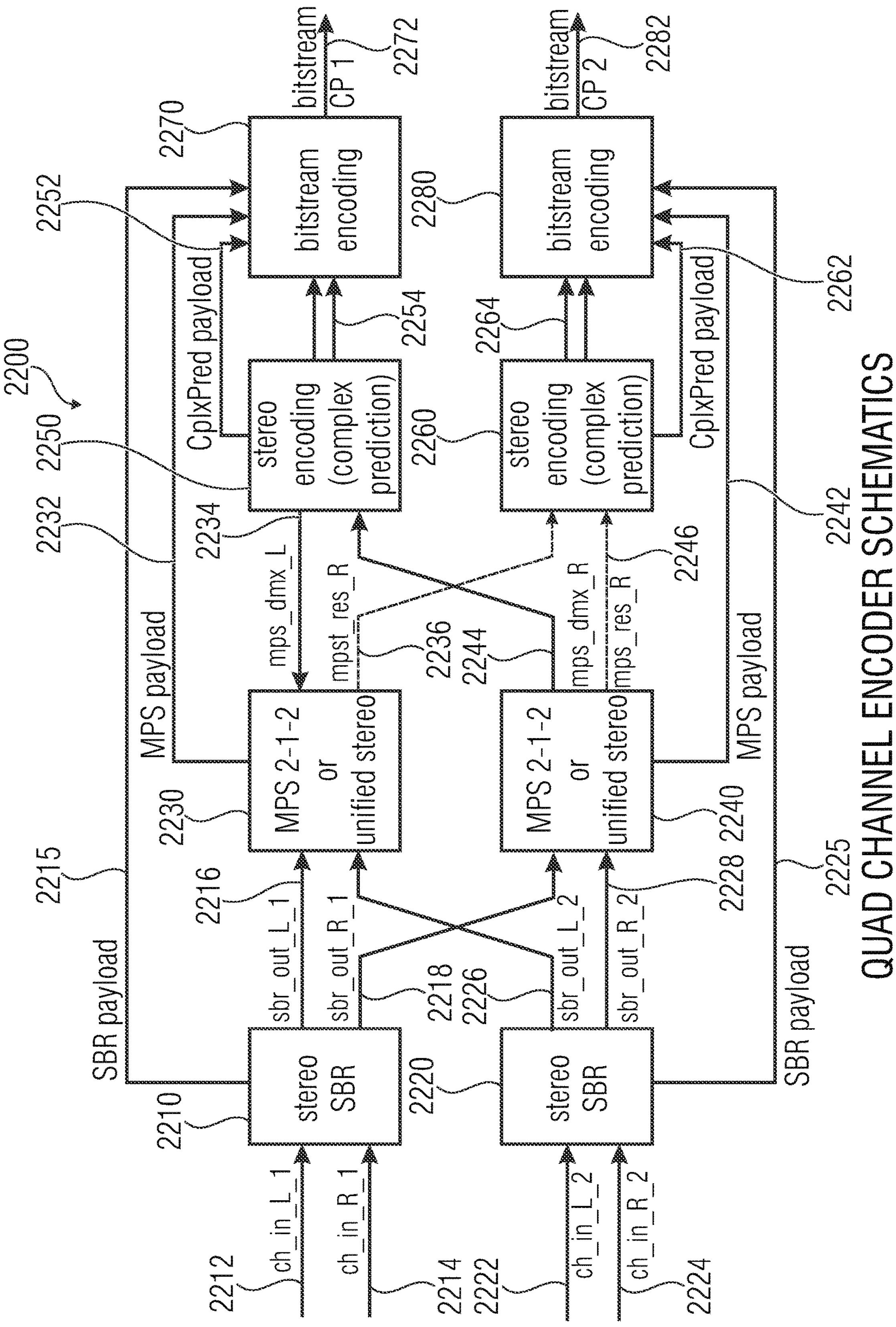
FIG. 21 shows a detailed block schematic diagram of a Quad Channel Encoder, according to an embodiment of the present invention.

FIG. 21 shows a block schematic diagram of a Quad Channel Encoder 2200, according to an embodiment of the present invention. In other words, a Quad Channel Encoder (Quad Channel Element), which may be considered as a Core Encoder Tool, is illustrated in FIG. 21.

The Quad Channel Encoder 2200 comprises a first Stereo SBR 2210, which receives a first left-channel input signal 2212 and a second left channel input signal 2214, and which provides, on the basis thereof, a first SBR payload 2215, a first left channel SBR output signal 2216 and a first right channel SBR output signal 2218. Moreover, the Quad Channel Encoder 2200 comprises a second Stereo SBR, which receives a second left-channel input signal 2222 and a second right channel input signal 2224, and which provides, on the basis thereof, a first SBR payload 2225, a first left channel SBR output signal 2226 and a first right channel SBR output signal 2228.

The Quad Channel Encoder 2200 comprises a first MPEG-Surround-type (MPS2-1-2 or Unified Stereo) multichannel encoder 2230 which receives the first left channel SBR output signal 2216 and the second left channel SBR output signal 2226, and which provides, on the basis thereof, a first MPS payload 2232, a left channel MPEG Surround downmix signal 2234 and, optionally, a left channel MPEG Surround residual signal 2236. The Quad Channel Encoder 2200 also comprises a second MPEG-Surround-type (MPS 2-1-2 or Unified Stereo) multi-channel encoder 2240 which receives the first right channel SBR output signal 2218 and the second right channel SBR output signal 2228, and which provides, on the basis thereof, a first MPS payload 2242, a right channel MPEG Surround downmix signal 2244 and, optionally, a right channel MPEG Surround residual signal 2246.

The Quad Channel Encoder 2200 comprises a first complex prediction stereo encoding 2250, which receives the left channel MPEG Surround downmix signal 2234 and the right channel MPEG Surround downmix signal 2244, and which provides, on the basis thereof, a complex prediction payload 2252 and a jointly encoded representation 2254 of the left channel MPEG Surround downmix signal 2234 and the right channel MPEG Surround downmix signal 2244. The Quad Channel Encoder 2200 comprises a second complex prediction stereo encoding 2260, which receives the left channel MPEG Surround residual signal 2236 and the right channel MPEG Surround residual signal 2246, and which provides, on the basis thereof, a complex prediction payload 2262 and a jointly encoded representation 2264 of the left channel MPEG Surround downmix signal 2236 and the right channel MPEG Surround downmix signal 2246.

The Quad Channel Encoder also comprises a first bitstream encoding 2270, which receives the jointly encoded representation 2254, the complex prediction payload 2252*m* the MPS payload 2232 and the SBR payload 2215 and provides, on the basis thereof, a bitstream portion representing a first channel pair element. The Quad Channel Encoder also comprises a second bitstream encoding 2280, which receives the jointly encoded representation 2264, the complex prediction payload 2262, the MPS payload 2242 and the SBR payload 2225 and provides, on the basis thereof, a bitstream portion representing a first channel pair element.

14. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

15. Conclusions

In the following, some conclusions will be provided.

The embodiments according to the invention are based on the consideration that, to account for signal dependencies between vertically and horizontally distributed channels, four channels can be jointly coded by hierarchically combining joint stereo coding tools. For example, vertical channel pairs are combined using MPS 2-1-2 and/or unified stereo with band-limited or full-band residual coding. In order to satisfy perceptual requirements for binaural unmasking, the output downmixes are, for example, jointly coded by use of complex prediction in the MDCT domain, which includes the possibility of left-right and mid-side coding. If residual signals are present, they are horizontally combined using the same method.

Moreover, it should be noted that embodiments according to the invention overcome some or all of the disadvantages of conventional technology. Embodiments according to the invention are adapted to the 3D audio context, wherein the loudspeaker channels are distributed in several height layers, resulting in a horizontal and vertical channel pairs. It has been found the joint coding of only two channels as defined in USAC is not sufficient to consider the spatial and perceptual relations between channels. However, this problem is overcome by embodiments according to the invention.

Moreover, conventional MPEG surround is applied in an additional pre-/post processing step, such that residual signals are transmitted individually without the possibility of joint stereo coding, e.g., to explore dependencies between left and right radical residual signals. In contrast, embodiments according to the invention allow for an efficient encoding/decoding by making use of such dependencies.

To further conclude, embodiments according to the invention create an apparatus, a method or a computer program for encoding and decoding as described herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC 23003-3: 2012—Information Technology—MPEG Audio Technologies, Part 3: Unified Speech and Audio Coding;

[2] ISO/IEC 23003-1: 2007—Information Technology—MPEG Audio Technologies, Part 1: MPEG Surround

The invention claimed is:

1. An audio decoder for providing at least four audio channel signals on the basis of an encoded representation, wherein the audio decoder is configured to provide a first residual signal and a second residual signal on the basis of a jointly encoded representation of the first residual signal and of the second residual signal;

wherein the audio decoder is configured to provide a first audio channel signal and a second audio channel signal on the basis of a first signal and using the first residual signal;

wherein the audio decoder is configured to provide a third audio channel signal and a fourth audio channel signal on the basis of a second signal and using the second residual signal; and wherein the audio decoder is implemented using a hardware apparatus, a computer, or a combination of a hardware apparatus and a computer.

2. The audio decoder according to claim 1, wherein the audio decoder is configured to provide the first signal and the second signal on the basis of a jointly-encoded representation of the first signal and the second signal using a multi-channel decoding.

3. The audio decoder according to claim 1, wherein the audio decoder is configured to provide the first residual signal and the second residual signal on the basis of the jointly encoded representation of the first residual signal and of the second residual signal using a prediction-based multi-channel decoding.

4. The audio decoder according to claim 1, wherein the audio decoder is configured to provide the first residual signal and the second residual signal on the basis of the jointly encoded representation of the first residual signal and of the second residual signal using a residual-signal-assisted multi-channel decoding.

5. The audio decoder according to claim 3, wherein the prediction-based multi-channel decoding is configured to evaluate a prediction parameter describing a contribution of a signal component, which is derived using a signal component of a previous frame, to the provision of the residual signals of the current frame.

6. The audio decoder according to claim 3, wherein the prediction-based multi-channel decoding is configured to obtain the first residual signal and the second residual signal on the basis of a downmix signal of the first residual signal and of the second residual signal and on the basis of a common residual signal of the first residual signal and the second residual signal.

7. The audio decoder according to claim 6, wherein the prediction-based multi-channel decoding is configured to apply the common residual signal with a first sign, to obtain the first residual signal, and to apply the common residual signal with a second sign, which is opposite to the first sign, to obtain the second residual signal.

8. The audio decoder according to claim 1, wherein the audio decoder is configured to provide the first residual signal and the second residual signal on the basis of the jointly encoded representation of the first residual signal and of the second residual signal using a multi-channel decoding which is operative in a MDCT domain.

9. The audio decoder according to claim 1, wherein the audio decoder is configured to provide the first residual signal and the second residual signal on the basis of the jointly encoded representation of the first residual signal and of the second residual signal using a USAC Complex Stereo Prediction.

10. The audio decoder according to claim 1, wherein the audio decoder is configured to provide the first audio channel signal and the second audio channel signal on the basis of a first downmix signal and the first residual signal using a parameter-based residual-signal-assisted multi-channel decoding; and wherein the audio decoder is configured to provide the third audio channel signal and the fourth audio channel signal on the basis of a second downmix signal and the second residual signal using a parameter-based residual-signal-assisted multi-channel decoding.

11. The audio decoder according to claim 10, wherein the parameter-based residual-signal-assisted multi-channel decoding is configured to evaluate one or more parameters describing a desired correlation between two channels and/or level differences between two channels in order to provide the two or more audio channel signals on the basis of a respective one of the downmix signals and a corresponding one of the residual signals.

12. The audio decoder according to claim 1, wherein the audio decoder is configure to provide the first audio channel signal and the second audio channel signal on the basis of a first downmix signal and the first residual signal using a residual-signal-assisted multi-channel decoding which is operative in a QMF domain; and wherein the audio decoder is configured to provide the third audio channel signal and the fourth audio channel signal on the basis of a second downmix signal and the second residual signal using a residual-signal-assisted multi-channel decoding which is operative in the QMF domain.

13. The audio decoder according to claim 1, wherein the audio decoder is configured to provide the first audio channel signal and the second audio channel signal on the basis of a first downmix signal and the first residual signal using a MPEG Surround 2-1-2 decoding or a Unified Stereo Decoding; and wherein the audio decoder is configured to provide the third audio channel signal and the fourth audio channel signal on the basis of a second downmix signal and the second residual signal using a MPEG Surround 2-1-2 decoding or a Unified Stereo Decoding.

14. The audio decoder according to claim 1, wherein the first residual signal and the second residual signal are associated with different horizontal positions of an audio scene or with different azimuth positions of the audio scene.

15. The audio decoder according to claim 1, wherein the first audio channel signal and the second audio channel signal are associated with vertically neighboring positions of an audio scene, and wherein the third audio channel signal and the fourth audio channel signal are associated with vertically neighboring positions of the audio scene.

16. The audio decoder according to claim 1, wherein the first audio channel signal and the second audio channel signal are associated with a first horizontal position or azimuth position of an audio scene, and wherein the third audio channel signal and the fourth audio channel signal are associated with a second horizontal position or azimuth position of the audio scene, which is different from the first horizontal position or the first azimuth position.

17. The audio decoder according to claim 1, wherein the first residual signal is associated with a left side of an audio scene, and wherein the second residual signal is associated with a right side of an audio scene.

18. The audio decoder according to claim 17, wherein the first audio channel signal and the second audio channel signal are associated with the left side of the audio scene, and wherein the third audio channel signal and the fourth audio channel signal are associated with the right side of the audio scene.

19. The audio decoder according to claim 18, wherein the first audio channel signal is associated with a lower left position of the audio scene, wherein the second audio channel signal is associated with an upper left position of the audio scene, wherein the third audio channel signal is associated with a lower right position of the audio scene, and wherein the fourth audio channel signal is associated with an upper right position of the audio scene.

20. The audio decoder according to claim 1, wherein the audio decoder is configured to provide a first downmix signal and a second downmix signal on the basis of a jointly-encoded representation of the first downmix signal and the second downmix signal using a multi-channel decoding, wherein the first downmix signal is associated with a left side of an audio scene and the second downmix signal is associated with a right side of the audio scene.

21. The audio decoder according to claim 1, wherein the audio decoder is configured to provide a first downmix signal and a second downmix signal on the basis of a jointly encoded representation of the first downmix signal and of the second downmix signal using a prediction-based multi-channel decoding.

22. The audio decoder according to claim 1, wherein the audio decoder is configured to provide a first downmix signal and a second downmix signal on the basis of a jointly encoded representation of the first downmix signal and of the second downmix signal using a residual-signal-assisted prediction-based multi-channel decoding.

23. The audio decoder according to claim 1, wherein the audio decoder is configured to perform a first multi-channel bandwidth extension on the basis of the first audio channel signal and the third audio channel signal, and wherein the audio decoder is configured to perform a second multi-channel bandwidth extension on the basis of the second audio channel signal and the fourth audio channel signal.

24. The audio decoder according to claim 23, wherein the audio decoder is configured to perform the first multi-channel bandwidth extension in order to obtain two or more bandwidth-extended audio channel signals associated with a first common horizontal plane or a first common elevation of an audio scene on the basis of the first audio channel signal and the third audio channel signal and one or more bandwidth extension parameters, and wherein the audio decoder is configured to perform the second multi-channel bandwidth extension in order to obtain two or more bandwidth-extended audio channel signals associated with a second common horizontal plane or a second common elevation of the audio scene on the basis of the second audio channel signal and the fourth audio channel signal and one or more bandwidth extension parameters.

25. The audio decoder according to claim 1, wherein the jointly encoded representation of the first residual signal and of the second residual signal comprises a channel pair element comprising a downmix signal of the first and second residual signal and a common residual signal of the first and second residual signal.

26. The audio decoder according to claim 1, wherein the audio decoder is configured to provide a first downmix signal and a second downmix signal on the basis of a jointly-encoded representation of the first downmix signal and the second downmix signal using a multi-channel decoding, wherein the jointly encoded representation of the first downmix signal and of the second downmix signal comprises a channel pair element comprising a downmix signal of the first and second downmix signal and a common residual signal of the first and second downmix signal.

27. An audio encoder for providing an encoded representation on the basis of at least four audio channel signals, wherein the audio encoder is configured to jointly encode at least a first audio channel signal and a second audio channel signal, to obtain a first signal and a first residual signal; and wherein the audio encoder is configured to jointly encode at least a third audio channel signal and a fourth audio channel signal, to obtain a second signal and a second residual signal;

wherein the audio encoder is configured to jointly encode the first residual signal and the second residual signal, to obtain a jointly encoded representation of the residual signals; and wherein the audio encoder is implemented using a hardware apparatus, a computer, or a combination of a hardware apparatus and a computer.

28. The audio encoder according to claim 27, wherein the audio encoder is configured to jointly encode the first signal and the second signal using a multi-channel encoding, to obtain a jointly encoded representation of the first and second signals.

29. The audio encoder according to claim 28, wherein the audio encoder is configured to jointly encode the first residual signal and the second residual signal using a prediction-based multi-channel encoding, and wherein the audio encoder is configured to jointly encode the first signal and the second signal using a prediction-based multi-channel encoding.

30. The audio encoder according to claim 27, wherein the audio encoder is configured to jointly encode at least the first audio channel signal and the second audio channel signal using a parameter-based residual-signal-assisted multi-channel encoding, and wherein the audio encoder is configured to jointly encode at least the third audio channel signal and the fourth audio channel signal using a parameter-based residual-signal-assisted multi-channel encoding.

31. The audio encoder according to claim 27, wherein the first audio channel signal and the second audio channel signal are associated with vertically neighboring positions of an audio scene, and wherein the third audio channel signal and the fourth audio channel signal are associated with vertically neighboring positions of the audio scene.

32. The audio encoder according to claim 27, wherein the first audio channel signal and the second audio channel signal are associated with a first horizontal position or azimuth position of an audio scene, and wherein the third audio channel signal and the fourth audio channel signal are associated with a second horizontal position or azimuth position of the audio scene, which is different from the first horizontal position or azimuth position.

33. The audio encoder according to claim 27, wherein the first residual signal is associated with a left side of an audio scene, and wherein the second residual signal is associated with a right side of the audio scene.

34. The audio encoder according to claim 33, wherein the first audio channel signal and the second audio channel signal are associated with the left side of the audio scene, and wherein the third audio channel signal and the fourth audio channel signal are associated with the right side of the audio scene.

35. The audio encoder according to claim 34, wherein the first audio channel signal is associated with a lower left position of the audio scene, wherein the second audio channel signal is associated with an upper left position of the audio scene, wherein the third audio channel signal is associated with a lower right position of the audio scene, and wherein the fourth audio channel signal is associated with an upper right position of the audio scene.

36. The audio encoder according to claim 27, wherein the audio encoder is configured to jointly encode the first downmix signal and the second downmix signal using a multi-channel encoding, to obtain a jointly encoded representation of the downmix signals, wherein the first downmix signal is associated with a left side of an audio scene and the second downmix signal is associated with a right side of the audio scene.

37. A method for providing at least four audio channel signals on the basis of an encoded representation, the method comprising:

providing a first residual signal and a second residual signal on the basis of a jointly encoded representation of the first residual signal and the second residual signal;

providing a first audio channel signal and a second audio channel signal on the basis of a first signal and the first residual signal; and providing a third audio channel signal and a fourth audio channel signal on the basis of a second signal and the second residual signal.

38. A method for providing an encoded representation on the basis of at least four audio channel signals, the method comprising:

jointly encoding at least a first audio channel signal and a second audio channel signal, to obtain a first signal and a first residual signal;

jointly encoding at least a third audio channel signal and a fourth audio channel signal, to obtain a second signal and a second residual signal; and jointly encoding the first residual signal and the second residual signal, to obtain an encoded representation of the residual signals.

39. A non-transitory digital storage medium having stored thereon computer program for performing a method for providing at least four audio channel signals on the basis of an encoded representation, the method comprising:

providing a first residual signal and a second residual signal on the basis of a jointly encoded representation of the first residual signal and the second residual signal;

providing a first audio channel signal and a second audio channel signal on the basis of a first signal and the first residual signal; and providing a third audio channel signal and a fourth audio channel signal on the basis of a second signal and the second residual signal, when said computer program is run by a computer.

40. A non-transitory digital storage medium having stored thereon computer program for performing a method for providing an encoded representation on the basis of at least four audio channel signals, the method comprising:

jointly encoding at least a first audio channel signal and a second audio channel signal, to obtain a first signal and a first residual signal;

jointly encoding at least a third audio channel signal and a fourth audio channel signal, to obtain a second signal and a second residual signal; and jointly encoding the first residual signal and the second residual signal, to obtain an encoded representation of the residual signals, when said computer program is run by a computer.

* * * * *